US012565725B2

(12) United States Patent
Kim et al.

(10) Patent No.: US 12,565,725 B2
(45) Date of Patent: Mar. 3, 2026

(54) WASHING MACHINE AND CONTROLLING METHOD FOR THE SAME

(71) Applicants: SAMSUNG ELECTRONICS CO., LTD., Suwon-si (KR); INHA UNIVERSITY RESEARCH AND BUSINESS FOUNDATION, Incheon (KR)

(72) Inventors: Doyeon Kim, Suwon-si (KR); Seunghun Lee, Suwon-si (KR); Seungbok Choi, Incheon (KR); Byunghyuk Kang, Incheon (KR); Jeonghoon Kang, Suwon-si (KR); Bogyu Kim, Pohang-si (KR); Yujin Park, Incheon (KR); Jaeik Park, Suwon-si (KR); Junhyun Park, Suwon-si (KR); Junhyeong Park, Suwon-si (KR); Sejun Lee, Suwon-si (KR); Hyungjin Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 18/210,321

(22) Filed: Jun. 15, 2023

(65) Prior Publication Data

US 2024/0018710 A1     Jan. 18, 2024

Related U.S. Application Data

(63) Continuation of application No. PCT/KR2023/006151, filed on May 4, 2023.

(30) Foreign Application Priority Data

Jul. 13, 2022     (KR) ........................ 10-2022-0086560

(51) Int. Cl.
D06F 33/48 (2020.01)
D06F 23/02 (2006.01)
(Continued)

(52) U.S. Cl.
CPC .............. D06F 33/48 (2020.02); D06F 23/02 (2013.01); D06F 34/20 (2020.02); D06F 37/225 (2013.01);
(Continued)

(58) Field of Classification Search
CPC ...................................................... D06F 33/48
See application file for complete search history.

(56) References Cited

U.S. PATENT DOCUMENTS

| | | | |
|---|---|---|---|
| 5,907,880 A | 6/1999 | Durazzani et al. | |
| 6,394,239 B1 | 5/2002 | Carlson | |

(Continued)

FOREIGN PATENT DOCUMENTS

| | | |
|---|---|---|
| CN | 106757991 A | 5/2017 |
| CN | 112921587 A | 6/2021 |

(Continued)

OTHER PUBLICATIONS

Extended European Search Report dated Apr. 16, 2025 for Application No. 23839769.9.

(Continued)

*Primary Examiner* — Jason Y Ko
(74) *Attorney, Agent, or Firm* — STAAS & HALSEY LLP

(57) ABSTRACT

A washing machine including a cabinet; a tub disposed in the cabinet; a drum arranged inside the tub so as to be rotatable; at least one damper coupled to the cabinet and the tub, and including at least one coil configured to generate a magnetic field based on a voltage applied to the at least one coil, and a magneto-rheological fluid having a viscosity that changes (Continued)

based on the magnetic field; and a controller configured to control the voltage applied to the at least one coil based on a rotation speed of the drum and a vibration value of the tub so as to generate the magnetic field to change the viscosity of the magneto-rheological fluid to reduce the vibration of the tub caused by the rotation of the drum.

20 Claims, 20 Drawing Sheets

(51) Int. Cl.

| | | |
|---|---|---|
| *D06F 34/20* | (2020.01) | |
| *D06F 37/22* | (2006.01) | |
| *F16F 9/53* | (2006.01) | |
| *F16F 15/00* | (2006.01) | |
| *G05D 24/02* | (2006.01) | |
| *D06F 103/26* | (2020.01) | |
| *D06F 105/52* | (2020.01) | |

(52) U.S. Cl.
CPC ............ *F16F 9/535* (2013.01); *F16F 15/002* (2013.01); *G05D 24/02* (2013.01); *D06F 2103/26* (2020.02); *D06F 2105/52* (2020.02); *F16F 2222/12* (2013.01); *F16F 2228/066* (2013.01); *F16F 2230/18* (2013.01)

(56) References Cited

U.S. PATENT DOCUMENTS

| | | | |
|---|---|---|---|
| 8,387,420 | B2 | 3/2013 | Kawabata et al. |
| 8,727,082 | B2 | 5/2014 | Dillmann et al. |
| 8,757,335 | B2 | 6/2014 | Kaneda et al. |
| 8,851,247 | B2 | 10/2014 | Shiga |
| 9,359,705 | B2 | 6/2016 | Nishimura et al. |
| 10,288,140 | B2 | 5/2019 | Xu et al. |
| 10,316,450 | B2 | 6/2019 | Wu et al. |
| 10,533,275 | B2 | 1/2020 | Im et al. |
| 10,550,910 | B2 | 2/2020 | Glanzner |
| 11,293,127 | B2 | 4/2022 | Kwon et al. |
| 11,313,429 | B2 | 4/2022 | Jang et al. |
| 2005/0150731 | A1 | 7/2005 | Hitchcock et al. |
| 2006/0006027 | A1 | 1/2006 | Carlson et al. |
| 2009/0151398 | A1 | 6/2009 | Fang et al. |
| 2012/0011661 | A1 | 1/2012 | Wauer |
| 2012/0031719 | A1 | 2/2012 | Liao et al. |
| 2016/0312394 | A1 | 10/2016 | Wang et al. |
| 2018/0209085 | A1 | 7/2018 | Xu et al. |
| 2018/0320751 | A1 | 11/2018 | Kadokura et al. |
| 2018/0355539 | A1 | 12/2018 | Xu et al. |
| 2020/0325959 | A1 | 10/2020 | Sato et al. |
| 2020/0392660 | A1 | 12/2020 | Park |

FOREIGN PATENT DOCUMENTS

| | | | |
|---|---|---|---|
| EP | 1 094 239 B1 | 4/2004 | |
| EP | 2 072 653 A1 | 6/2009 | |
| EP | 2 568 070 A1 | 3/2013 | |
| EP | 2 511 564 B1 | 5/2018 | |
| EP | 3 382 084 A1 | 10/2018 | |
| EP | 3 497 276 B1 | 12/2020 | |
| JP | 5-208092 | 8/1993 | |
| JP | 8-19687 | 1/1996 | |
| JP | 10-323489 | 12/1998 | |
| JP | 2001-170390 | 6/2001 | |
| JP | 2001-276475 | 10/2001 | |
| JP | 2002-502942 | 1/2002 | |
| JP | 2005-121135 | 5/2005 | |
| JP | 2005-291284 | 10/2005 | |
| JP | 2005-291338 | 10/2005 | |
| JP | 3747486 | 2/2006 | |
| JP | 2008-183297 | 8/2008 | |
| JP | 2008-295906 | 12/2008 | |
| JP | 2010-187976 | 9/2010 | |
| JP | 2010-273713 | 12/2010 | |
| JP | 2010-284252 | 12/2010 | |
| JP | 2011-41644 | 3/2011 | |
| JP | 2011-41690 | 3/2011 | |
| JP | 2011-41844 | 3/2011 | |
| JP | 2011-104038 | 6/2011 | |
| JP | 2011-229554 | 11/2011 | |
| JP | 2011-240019 | 12/2011 | |
| JP | 2011-245231 | 12/2011 | |
| JP | 2011-250852 | 12/2011 | |
| JP | 2012-61142 | 3/2012 | |
| JP | 2012-85732 | 5/2012 | |
| JP | 2012-141045 | 7/2012 | |
| JP | 2012-148033 | 8/2012 | |
| JP | 2012-157574 | 8/2012 | |
| JP | 2012-165943 | 9/2012 | |
| JP | 2012-179079 | 9/2012 | |
| JP | 2013-27613 | 2/2013 | |
| JP | 2013-34651 | 2/2013 | |
| JP | 2013-85683 | 5/2013 | |
| JP | 2013-85685 | 5/2013 | |
| JP | 2013-102803 | 5/2013 | |
| JP | 2013-111261 | 6/2013 | |
| JP | 2013-128529 | 7/2013 | |
| JP | 2013-169272 | 9/2013 | |
| JP | 2013-248232 | 12/2013 | |
| JP | 2015-66060 | 4/2015 | |
| JP | 2015-66061 | 4/2015 | |
| JP | 5751980 | 7/2015 | |
| JP | 2015-150378 | 8/2015 | |
| JP | 2015-229006 | 12/2015 | |
| JP | 2016-2093 | 1/2016 | |
| JP | 5851111 | 2/2016 | |
| JP | 6072722 | 2/2017 | |
| JP | 2017-111464 | 6/2017 | |
| JP | 2017-526874 | 9/2017 | |
| JP | 2018-61552 | 4/2018 | |
| JP | 2018-509566 | 4/2018 | |
| JP | 6349274 | 6/2018 | |
| JP | 2018-519952 | 7/2018 | |
| JP | 2019-51193 | 4/2019 | |
| JP | 2020-89404 | A | 6/2020 |
| KR | 95-29432 | | 11/1995 |
| KR | 1999-0027602 | | 7/1999 |
| KR | 2000-0009762 | | 2/2000 |
| KR | 10-0531826 | | 11/2005 |
| KR | 10-2007-0100047 | | 10/2007 |
| KR | 10-2010-0050382 | | 5/2010 |
| KR | 10-2010-0050382 | A | 5/2010 |
| KR | 10-2010-0065261 | | 6/2010 |
| KR | 10-2010-0086895 | | 8/2010 |
| KR | 10-2011-0020179 | | 3/2011 |
| KR | 10-2011-0101242 | | 9/2011 |
| KR | 10-2011-0103831 | | 9/2011 |
| KR | 10-2011-0107267 | | 9/2011 |
| KR | 10-2011-0118952 | | 11/2011 |
| KR | 10-2011-0124455 | | 11/2011 |
| KR | 10-2011-0131088 | | 12/2011 |
| KR | 10-2011-0132983 | | 12/2011 |
| KR | 10-2011-0134841 | | 12/2011 |
| KR | 10-2011-0137718 | | 12/2011 |
| KR | 10-2012-0005670 | | 1/2012 |
| KR | 10-2012-0022558 | | 3/2012 |
| KR | 10-2012-0022646 | | 3/2012 |
| KR | 10-2012-0028227 | | 3/2012 |
| KR | 10-1130785 | | 3/2012 |
| KR | 10-2012-0033240 | | 4/2012 |
| KR | 20-0459493 | | 4/2012 |
| KR | 10-2012-0061613 | | 6/2012 |
| KR | 10-2012-0064902 | | 6/2012 |
| KR | 10-2012-0098825 | | 9/2012 |
| KR | 10-2012-0105878 | | 9/2012 |
| KR | 10-2012-0105880 | | 9/2012 |
| KR | 10-2012-0105882 | | 9/2012 |
| KR | 10-2012-0106122 | | 9/2012 |
| KR | 10-2012-0116850 | | 10/2012 |
| KR | 10-2012-0119991 | | 11/2012 |
| KR | 10-1199598 | | 11/2012 |

(56)     References Cited

FOREIGN PATENT DOCUMENTS

| KR | 10-2012-0132308 | 12/2012 |
| KR | 10-2012-0135016 | 12/2012 |
| KR | 10-2012-0140599 | 12/2012 |
| KR | 10-2013-0001733 | 1/2013 |
| KR | 10-2013-0002114 | 1/2013 |
| KR | 10-2013-0010798 | 1/2013 |
| KR | 10-2013-0014058 A | 2/2013 |
| KR | 10-1233651 | 2/2013 |
| KR | 10-1266063 | 5/2013 |
| KR | 10-1285186 | 7/2013 |
| KR | 10-1291874 | 7/2013 |
| KR | 10-1332731 | 11/2013 |
| KR | 10-1348432 | 1/2014 |
| KR | 10-1375695 | 3/2014 |
| KR | 10-1412935 | 7/2014 |
| KR | 10-1439770 | 10/2014 |
| KR | 10-1488038 | 2/2015 |
| KR | 10-1516470 | 5/2015 |
| KR | 10-1667576 | 10/2016 |
| KR | 10-1679244 | 11/2016 |
| KR | 10-1757434 | 7/2017 |
| KR | 10-1757435 | 7/2017 |
| KR | 10-1772081 | 8/2017 |
| KR | 10-1846785 | 4/2018 |
| KR | 10-1846786 | 5/2018 |
| KR | 10-1973696 | 4/2019 |
| KR | 10-1982218 | 5/2019 |
| KR | 10-1984633 | 5/2019 |
| KR | 10-2001589 | 7/2019 |
| KR | 10-2029890 | 10/2019 |
| KR | 10-2048040 | 11/2019 |
| KR | 10-2061974 | 1/2020 |
| KR | 10-2090687 | 3/2020 |
| KR | 10-2091107 | 3/2020 |
| KR | 10-2098882 | 4/2020 |
| KR | 10-2169167 | 10/2020 |
| KR | 10-2304812 | 9/2021 |
| KR | 10-2022-0009511 | 1/2022 |
| WO | WO 98/04846 | 2/1998 |
| WO | WO 98/22727 | 5/1998 |
| WO | WO 2010/029112 A1 | 3/2010 |
| WO | WO 2016/023628 A1 | 2/2016 |
| WO | WO 2017/064655 A1 | 4/2017 |
| WO | WO2018/173779 | 1/2020 |

OTHER PUBLICATIONS

International Search Report dated Aug. 29, 2023 for International Application No. PCT/KR2023/006151.

Written Opinion of International Searching Authority dated Aug. 29, 2023 for International Application No. PCT/KR2023/006151.

| SECTION | | VIBRATION VALUE | DUTY RATIO |
|---|---|---|---|
| WEIGHT SENSING SECTION | | – | a1 |
| UNBALANCE SENSING SECTION | | – | a2 |
| RESONANCE ACCELERATION SECTION | FIRST SECTION | V11 < V | b11 |
| | | V12 < V < V11 | b12 |
| | | V13 < V < V12 | b13 |
| | | V14 < V < V13 | b14 |
| | SECOND SECTION | V21 < V | b21 |
| | | V22 < V < V21 | b22 |
| | | V23 < V < V22 | b23 |
| | | V24 < V < V23 | b24 |
| | THIRD SECTION | ⋮ | b31 |
| | | | b32 |
| | | | b33 |
| | | | b34 |
| | ⋮ | ⋮ | ⋮ |
| | M-TH SECTION | ⋮ | ⋮ |
| | N-TH SECTION | ⋮ | ⋮ |
| HIGH SPEED SPIN-DRY SECTION | | – | O |
| DECELERATION SECTION | FIRST SECTION | – | O |
| | SECOND SECTION | – | a3 |
| | THIRD SECTION | – | O |

FIG. 15

| SECTION | VIBRATION VALUE | WORKING COIL |
|---|---|---|
| RESONANCE ACCELERATION SECTION | K1 > K | C1 |
| | K2 > K > K1 | C2 |
| | K3 > K > K2 | C3 |
| | ″ | C1 + C2 |
| | ″ | C1 + C3 |
| | ″ | C2 + C3 |
| | ″ | C1 + C2 + C3 |

FIG. 17

| SECTION | | VIBRATION VALUE | DUTY RATIO | |
|---|---|---|---|---|
| | | | FIRST DAMPER | SECOND DAMPER |
| WEIGHT SENSING SECTION | | | a1 | a1 |
| UNBALANCE SENSING SECTION | | | a2 | a2 |
| RESONANCE ACCELERATION SECTION | FIRST SECTION | V11 < V | b11 | e11 |
| | | V12 < V < V11 | b12 | e12 |
| | | V13 < V < V12 | b13 | e13 |
| | | V14 < V < V13 | b14 | e14 |
| | SECOND SECTION | V21 < V | b21 | e21 |
| | | V22 < V < V21 | b22 | e22 |
| | | V23 < V < V22 | b23 | e23 |
| | | V24 < V < V23 | b24 | e24 |
| | THIRD SECTION | · · · | b31 | e31 |
| | | | b32 | e32 |
| | | | b33 | e33 |
| | | | b34 | e34 |
| | · · · | · · · | · · · | · · · |
| | M-TH SECTION | · · · | · · · | · · · |
| | N-TH SECTION | · · · | · · · | · · · |
| HIGH SPEED SPIN-DRY SECTION | | – | O | O |
| DECELERATION SECTION | FIRST SECTION | – | O | O |
| | SECOND SECTION | – | a3 | a3 |
| | THIRD SECTION | – | O | O |

WASHING MACHINE AND CONTROLLING METHOD FOR THE SAME

CROSS-REFERENCE TO RELATED APPLICATIONS

This application is a continuation application, under 35 U.S.C. § 111 (a), of International Application No. PCT/KR2023/006151, filed on May 4, 2023, which claims priority to Korean Patent Application No. 10-2022-0086560, filed Jul. 13, 2022, in the Korean Intellectual Property Office, the disclosures of which are incorporated by reference herein in their entireties.

BACKGROUND

1. Field

The disclosure relates to a washing machine and a control method of the washing machine, and more particularly, to a washing machine and a control method of the washing machine for reducing vibration of a tub using a magnetic damper.

2. Description of the Related Art

In general, a washing machine includes a tub accommodating water for washing and a drum rotatably installed in the tub. The washing machine can wash the laundry by rotating the drum containing the laundry.

The washing machine may perform a washing cycle including a washing process for washing laundry, a rinsing process for rinsing the washed laundry, and a spin-dry process for spin-drying the laundry.

While the washing machine performs the washing cycle, the tub may vibrate depending on the rotation of the drum. To solve this, the washing machine may include a damper for supporting the tub and reducing damping vibration and shake generated at the tub.

Recently, an electromagnetic damper including magneto-rheological fluid has been used. The magneto-rheological fluid is a material having a change in viscosity in response to a magnetic field and a change in damping force depending on the change in viscosity.

However, since the magneto-rheological fluid is an expensive material, a method capable of efficiently using a small amount of the magneto-rheological fluid would be advantageous in the industrial field.

SUMMARY

Aspects of embodiments of the disclosure will be set forth in part in the description which follows and, in part, will be apparent from the description, or may be learned by practice of the presented embodiments.

According to an embodiment of the disclosure, a washing machine may include a cabinet; a tub disposed in the cabinet; a drum arranged inside the tub so as to be rotatable; at least one damper coupled to the cabinet and the tub, and including at least one coil configured to generate a magnetic field based on a voltage applied to the at least one coil, and a magneto-rheological fluid having a viscosity that changes based on the magnetic field; and a controller configured to control the voltage applied to the at least one coil based on a rotation speed of the drum and a vibration value of the tub so as to generate the magnetic field to change the viscosity of the magneto-rheological fluid to reduce the vibration of the tub caused by the rotation of the drum.

According to an embodiment of the disclosure, the controller is configured to adjust a duty ratio of the voltage applied to the at least one coil to a first value based on the vibration value of the tub being less than a reference value, and adjust the duty ratio of the voltage applied to the at least one coil to a second value which is greater than the first value based on the vibration value of the tub being greater than the reference value.

According to an embodiment of the disclosure, the controller is configured to adjust a duty ratio of the voltage applied to the at least one coil based on a first lookup table in a first section of a washing machine process in which the drum is accelerated from a first speed to a second speed, and adjust the duty ratio of the voltage applied to the at least one coil based on a second lookup table that is different from the first lookup table in a second section of the washing machine process in which the drum is accelerated from the second speed to a third speed.

According to an embodiment of the disclosure, the at least one coil includes a first coil configured to receive a first voltage from a first power source, and a second coil configured to receive a second voltage from a second power source, and the controller is configured to selectively apply the first voltage and the second voltage to the first coil and the second coil, respectively, based on the rotation speed of the drum and the vibration value of the tub.

According to an embodiment of the disclosure, the controller is configured to apply the first voltage to the first coil based on the vibration value of the tub falling within a first reference range, apply the second voltage to the second coil based on the vibration value of the tub falling within a second reference range, and apply the first voltage and the second voltage to the first coil and the second coil, respectively, based on the vibration value of the tub falling within a third reference range.

According to an embodiment of the disclosure, the at least one damper includes at least one front damper with a first coil and disposed close to a front side of the tub, and at least one rear damper with a second coil and disposed close to a rear side of the tub, and the controller is configured to control the voltage applied to the first coil and the second coil so that a damping force of the at least one rear damper is greater than a damping force of the at least one front damper in a first section of a washing machine process in which the drum is accelerated from a first speed to a second speed, and control the voltage applied to the first coil and the second coil so that the damping force of the at least one front damper is greater than the damping force of the at least one rear damper in a second section of the washing machine process in which the drum is accelerated from the second speed to a third speed.

According to an embodiment of the disclosure, the rotation speed of the drum reaches approximately 160 RPM in the first section, and reaches approximately 230 RPM in the second section.

According to an embodiment of the disclosure, a vibration sensor configured to detect the vibration value of the tub, wherein the at least one damper includes at least one front damper with a first coil and disposed close to a front side of the tub, and at least one rear damper with a second coil and disposed close to a rear side of the tub, and the controller is configured to determine a first vibration value generated at the front side of the tub and a second vibration value generated at the rear side of the tub based on the vibration value of the tub detected by the vibration sensor, control the voltage applied to the first coil based on the first vibration value, and control the voltage applied to the second coil based on the second vibration value.

According to an embodiment of the disclosure, the controller is configured to control the voltage applied to the first coil and the second coil so that a damping force of the front damper is greater than a damping force of the rear damper based on the first vibration value being greater than the second vibration value, and the controller is configured to control the voltage applied to the first coil and the second coil so that the damping force of the rear damper is greater than the damping force of the front damper based on the second vibration value being greater than the first vibration value.

According to an embodiment of the disclosure, the controller is configured to adjust a duty ratio of the voltage applied to the first coil to be higher than a duty ratio of the voltage applied to the second coil such that the damping force of the front damper is greater than the damping force of the rear damper, and adjust the duty ratio of the voltage applied to the second coil to be higher than the duty ratio of the voltage applied to the first coil such that the damping force of the rear damper is greater than the damping force of the front damper.

According to an embodiment of the disclosure, a method of controlling a washing machine may include at least one damper, including at least one coil configured to generate a magnetic field based on a voltage applied to the at least one coil and a magneto-rheological fluid having a viscosity that changes depending on the magnetic field, the at least one damper coupled to a cabinet and a tub, the method comprising controlling the voltage applied to the at least one coil based on a rotation speed of the drum and a vibration value of the tub so as to generate the magnetic field to change the viscosity of the magneto-rheological fluid to reduce the vibration of the tub caused by the rotation of the drum.

According to an embodiment of the disclosure, the controlling the voltage applied to the at least one coil includes adjusting a duty ratio of the voltage applied to the at least one coil to a first value based on the vibration value of the tub being less than a reference value, and adjusting the duty ratio of the voltage applied to the at least one coil to a second value which is greater than the first value based on the vibration value of the tub being greater than the reference value.

According to an embodiment of the disclosure, the controlling the voltage applied to the at least one coil includes adjusting a duty ratio of the voltage applied to the at least one coil based on a first lookup table in a first section of a washing machine process in which the drum is accelerated from a first speed to a second speed; and adjusting the duty ratio of the voltage applied to the at least one coil based on a second lookup table that is different from the first lookup table in a second section of the washing machine process in which the drum is accelerated from the second speed to a third speed.

According to an embodiment of the disclosure, the at least one coil includes a first coil configured to receive a first voltage from a first power source, and a second coil configured to receive a second voltage from a second power source, and the controlling the voltage applied to the at least one coil includes selectively applying the first voltage and the second voltage to the first coil and the second coil, respectively, based on the rotation speed of the drum and the vibration value of the tub.

According to an embodiment of the disclosure, the selectively applying the first voltage and the second voltage to the first coil and the second coil, respectively, includes applying the first voltage to the first coil based on the vibration value of the tub falling within a first reference range, applying the second voltage to the second coil based on the vibration value of the tub falling within a second reference range; and applying the first voltage and the second voltage to the first coil and the second coil, respectively, based on the vibration value of the tub falling within a third reference range.

According to an embodiment of the disclosure, the at least one damper includes at least one front damper with a first coil and disposed close to a front side of the tub, and at least one rear damper with a second coil and disposed close to a rear side of the tub, and the controlling the voltage applied to the at least one coil includes controlling the voltage applied to the first coil and the second coil so that a damping force of the at least one rear damper is greater than a damping force of the at least one front damper in a first section of a washing machine process in which the drum is accelerated from a first speed to a second speed; and controlling the voltage applied to the first coil and the second coil so that the damping force of the at least one front damper is greater than the damping force of the at least one rear damper in a second section of the washing machine process in which the drum is accelerated from the second speed to a third speed.

According to an embodiment of the disclosure, the rotation speed of the drum reaches approximately 160 RPM in the first section, and reaches approximately 230 RPM in the second section.

According to an embodiment of the disclosure, the washing machine further includes a vibration sensor configured to detect the vibration value of the tub, and the at least one damper includes at least one front damper with a first coil and disposed close to the front side of the tub, and at least one rear damper with a second coil and disposed close to the rear side of the tub, and the controlling the voltage applied to the at least one coil includes determining a first vibration value generated at the front side of the tub and a second vibration value generated at the rear side of the tub based on the vibration value of the tub detected by the vibration sensor, controlling the voltage applied to the first coil based on the first vibration value, and controlling the voltage applied to the second coil based on the second vibration value.

According to an embodiment of the disclosure, the controlling the voltage applied to the at least one coil includes controlling the voltage applied to the first coil and the second coil so that a damping force of the front damper is greater than a damping force of the rear damper based on the first vibration value being greater than the second vibration value, and controlling the voltage applied to the first coil and the second coil so that the damping force of the rear damper is greater than the damping force of the front damper in case that the second vibration value is greater than the first vibration value.

According to an embodiment of the disclosure, the controlling the voltage applied to the first coil and the second coil so that the damping force of the front damper is greater than the damping force of the rear damper includes adjusting a duty ratio of the voltage applied to the first coil to be higher than a duty ratio of the voltage applied to the second coil, and the controlling the voltage applied to the first coil and the second coil so that the damping force of the rear damper is greater than the damping force of the front damper includes adjusting the duty ratio of the voltage applied to the second coil to be higher than the duty ratio of the voltage applied to the first coil.

According to an embodiment of the disclosure, a washing machine may include a cabinet; a tub disposed in the cabinet; a drum arranged inside the tub so as to be rotatable; a damper coupled to the cabinet and the tub and including a coil configured to generate a magnetic field based on a voltage applied to the coil, and a magneto-rheological fluid having a viscosity that changes based on the magnetic field; and a controller configured to control the voltage applied to the coil based on a rotation speed of the drum and a vibration value of the tub so as to generate the magnetic field to change the viscosity of the magneto-rheological fluid to reduce the vibration of the tub caused by the rotation of the drum.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 13 illustrates an example of a lookup table for controlling damping force of a damper based on the vibration value of a tub according to an exemplary embodiment of the disclosure.

FIG. 15 shows another example of a lookup table for controlling damping force of a damper based on the vibration value of a tub according to an exemplary embodiment of the disclosure.

FIG. 17 illustrates another example of a lookup table for controlling damping force of a damper based on the vibration value of a tub according to an exemplary embodiment of the disclosure.

DETAILED DESCRIPTION

Figure 1:
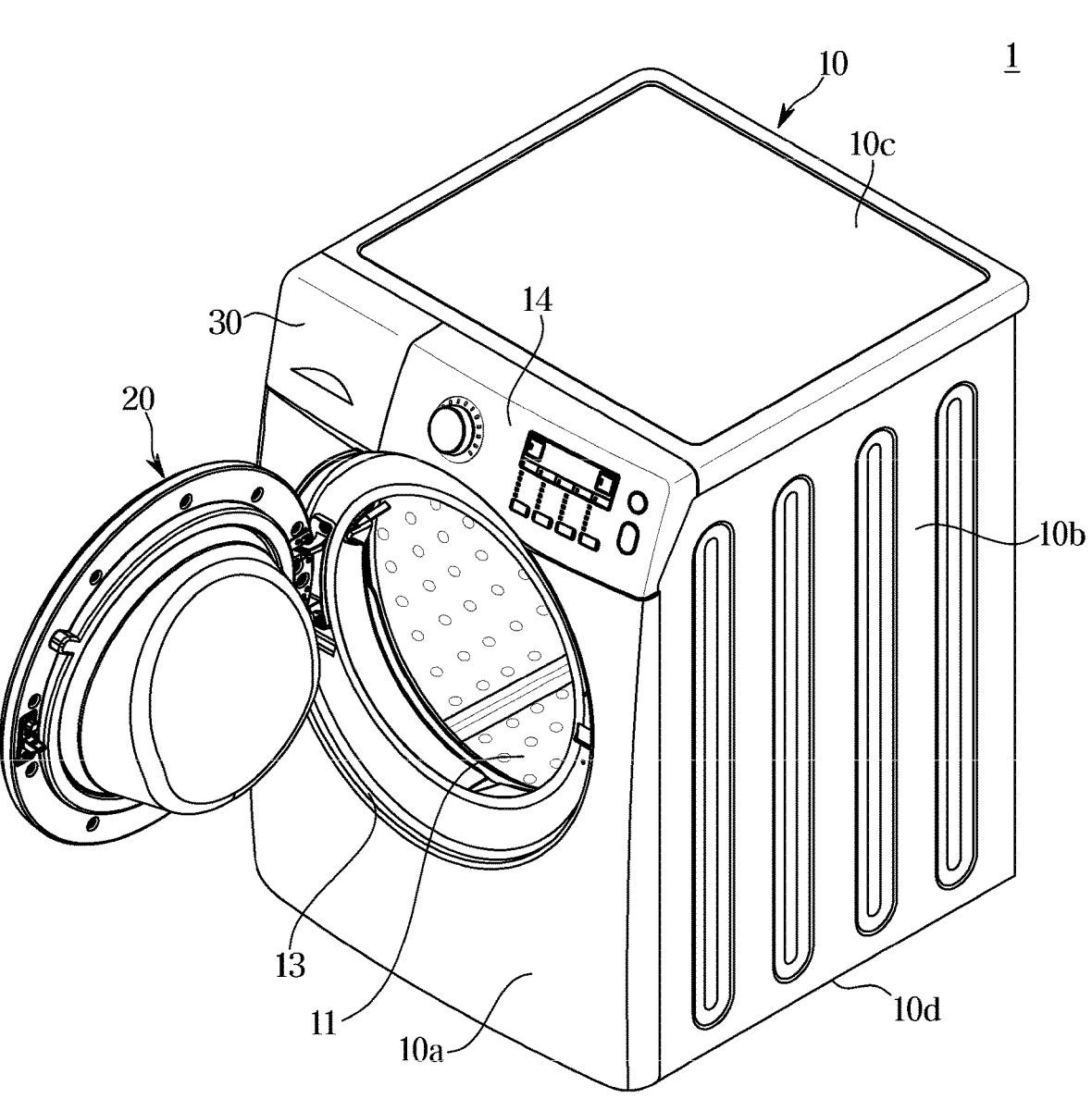
FIG. 1 is a perspective view illustrating a washing machine according to an exemplary embodiment of the disclosure.

The embodiments described herein and the configurations shown in the drawings are only preferred examples of the disclosed invention, and there may be various modifications that can be substituted for the embodiments and drawings of the present specification at the time of filing of the present disclosure.

The terminology used herein is used to describe the embodiments, but is not intended to limit and/or restrict the disclosed invention.

For example, a singular expression herein may include a plural expression unless the context clearly dictates otherwise.

Also, terms such as "comprise" or "have" are used to express the presence of a feature, number, step, action, component, part, or combination thereof described in the specification, accordingly, the possibility of additional presence or addition of one or more other features, numbers, steps, acts, elements, parts, or combinations thereof is not excluded.

In addition, terms including an ordinal number, such as "first" and "second", are used to distinguish one element from another element, and do not limit the one element.

In addition, terms such as "~ part", "~ group", "~ block", "~ member", and "~ module" may mean a unit for processing at least one function or operation. For example, the terms may refer to at least one hardware such as a field-programmable gate array (FPGA) or an application specific integrated circuit (ASIC), at least one software stored in a memory, or at least one process processed by the processor.

Hereinafter, an embodiment of the disclosed invention will be described in detail with reference to the accompanying drawings. The same reference numbers or symbols presented in the accompanying drawings may indicate parts or components that perform substantially the same functions.

Also, the working principle and embodiments of the present disclosure will be described with reference to the accompanying drawings.

An aspect of the disclosure provides a washing machine and a control method of the washing machine capable of efficiently controlling the damping force of an electromagnetic damper.

According to an embodiment of the present disclosure, a washing machine is classified into a vortex type washing machine in which a pulsator provided in the drum rotates to generate water flow and the laundry is washed by the generated water flow, and a drum-type washing machine in which laundry is washed by a lifter formed on the inner circumferential surface of the drum to raise and drop laundry.

Hereinafter, a drum-type washing machine will be described as a reference, but the technical idea of the present disclosure may also be used for a vortex-type washing machine, a dryer, or a clothes management apparatus.

Figure 2:
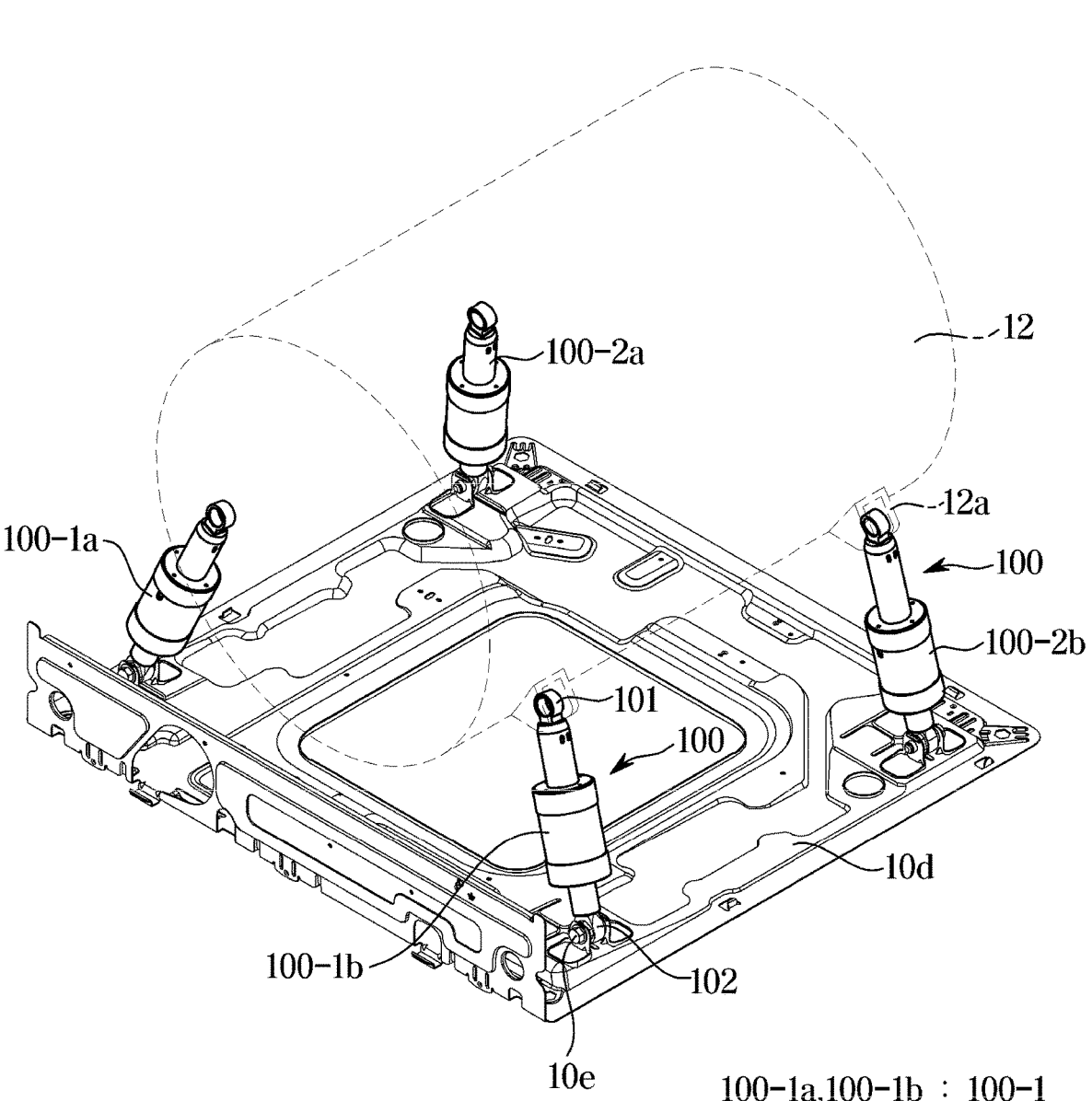
FIG. 2 is a perspective view illustrating some components of the washing machine shown in FIG. 1 according to an exemplary embodiment of the disclosure.

FIG. 1 is a perspective view illustrating a washing machine according to an embodiment of the present disclosure. FIG. 2 is a perspective view illustrating some components of the washing machine shown in FIG. 1.

Referring to FIGS. 1 and 2, a washing machine 1 according to an embodiment of the disclosure may include the washing machine 1. The washing machine includes a cabinet 10 forming an exterior, a tub 12 installed inside the cabinet 10 and storing washing water, and a cylindrical drum 11 rotatably installed inside the tub 12 and including a plurality of spin-dry holes formed on the wall surface.

The cabinet 10 is provided in a substantially hexahedral shape. The cabinet 10 may include a front surface 10a, a rear surface (not shown), both side surfaces 10b, an upper surface 10c, and a bottom surface 10d forming the bottom. The front surface 10a of the cabinet 10 may be the front panel 10a.

An opening 13 is formed at the front surface 10a of the cabinet 10 to insert or take out laundry. Openings are formed at the tub 12 and the drum 11 so that laundry can be put in or taken out of the front of the cabinet 10, and the openings of the tub 12 and the drum 11 may be positioned to correspond to the opening 13 of the front surface 10a.

A door 20 to open and close the openings of the tub 12 and the drum 11 is mounted at the opening 13 of the cabinet 10.

A control panel 14 for controlling the operation of the washing machine 1 is provided at the upper portion of the front surface 10a of the cabinet 10. The control panel 14 may be a component included in the front panel 10a.

The control panel 14 may include a display for displaying washing settings and/or washing operation information in response to a user input and an input for receiving a user input. The control panel 14 may provide a user interface for interaction between the user and the washing machine. For example, the input may include a power button, an operation button, a course selection dial, and a detailed setting button. In addition, the input may be provided as a tact switch, a push switch, a slide switch, a toggle switch The display may include a screen for displaying various information and an indicator for displaying detailed settings selected by the setting button. For example, the display may include a liquid crystal display (LCD) panel and/or a light emitting diode (LED).

A washing course of the washing machine 1 may include a predetermined process conditions (e.g., washing temperature, number of rinses, spin-dry intensity) depending on the type of laundry (e.g., shirt, pants, underwear, quilt), material (e.g., cotton, polyester, wool), and the amount of laundry. For example, a standard washing course may include process conditions that are universal for laundry. A bedding washing course may include process conditions optimized for washing the bedding. The washing course may include a variety of courses such as standard washing, powerful washing, wool washing, bedding washing, general clothing washing, baby clothes washing, towel washing, small amount washing, boiled washing, power-saving washing, outdoor washing, rinse plus spin-dry, and spin-dry.

A driving unit (not shown) may be provided at the rear of the drum 11. The driving unit may be configured to rotate the drum 11, and may be provided to rotate the drum 11 by transmitting driving force generated from a motor to a rotating shaft.

The driving unit may include a motor and a driving circuit. The driving circuit may supply a driving current for driving the motor to the motor in response to driving signal or motor control signal. The driving circuit may rectify AC power of an external power source to convert it into DC power, and convert the DC power into sinusoidal driving power. The driving circuit may include an inverter that outputs the converted driving power to the motor. The inverter may include a plurality of switching elements, and may turn off or on the plurality of switches based on the driving signal. The driving current can be supplied to the motor depending on the opening or closing of the switching elements. Also, the driving circuit may include a current sensor capable of measuring the driving current output from the inverter.

Although not shown, a water supply valve (not shown) and water supply pipes for controlling water supply may be provided at the upper portion of the tub 12. In addition, a detergent supply device 30 for supplying detergent into the tub 12 during the water supply process may be installed at the upper portion of the tub 12.

A drain device (not shown) including a drain pipe (not shown) and a drain valve (not shown) for draining the water inside the tub 12 may be provided under the tub 12.

In the embodiment of the present disclosure, the cabinet 10 is shown as an example in which the front, rear, both sides, top, and bottom are separately provided and assembled to form an exterior. However, the idea of the present disclosure is not limited thereto. For example, at least a portion of the front, rear, both sides, top, and bottom of the cabinet 10 may be integrally formed.

The tub 12 may be elastically supported from the cabinet 10 by a spring (not shown) provided above the tub 12 and the vibration reducing device 100 provided below the tub 12. The vibration reducing device 100 may be referred to as a damper 100. For example, when the vibration generated by the rotation of the drum 11 is transmitted to the tub 12 and the cabinet 10, the spring and the dampers 100 positioned between the tub 12 and the cabinet 10 may attenuate the vibration transmitted to the cabinet 10 by absorbing the vibration energy.

The damper 100 supporting the lower portion of the tub 12 may be provided with a plurality of dampers 100. For example, the number of dampers 100 supporting the tub 12 may be four.

The plurality of dampers 100 includes at least one first damper 100-1 coupled to the bottom surface of the cabinet 10 and the front surface of the tub 12, and at least one second damper 100-2 coupled to the bottom surface of the cabinet 10 and the rear surface of the tub 12.

That is, the at least one first damper 100-1 is disposed close to the front surface of tub 12 to effectively damp vibrations generated at the front surface of the tub 12, and the at least one second damper 100-2 is disposed close to the rear surface of the tub 12 to effectively damp vibrations generated at the rear surface of the tub 12.

Accordingly, the at least one first damper 100-1 may be referred to as a front damper, and the at least one second damper 100-2 may be referred to as a rear damper.

The at least one first damper 100-1 includes a 1-1 damper 100-1a coupled to the left side of the bottom surface of the cabinet 10 and the tub 12, and a 1-2 damper 100-1b coupled to the right side of the bottom surface of the cabinet 10 and tub 12.

The at least one second damper 100-2 includes a 2-1 damper 100-2*a* a coupled to the left side of the bottom surface of the cabinet 10 and the tub 12, and a 2-2 damper 100-2*b* coupled to the right side of the bottom surface of the cabinet 10 and tub 12.

In detail, the 1-1 damper 100-1*a* is coupled to the front left corner portion of the bottom surface of the cabinet 10, the 1-2 damper 100-1*b* is coupled to the front right corner portion of the bottom surface of the cabinet 10, the 2-1 damper 100-2*a* is coupled to the rear left corner portion of the bottom surface of the cabinet 10, and the 2-2 damper 100-2*b* is coupled to the rear right corner portion of the bottom surface of the cabinet 10.

Each of the plurality of dampers 100 may prevent vibration and shake of the tub 12 generated during the washing process from being transmitted toward the cabinet 10. The damper 100 includes the first fixer 101 formed at the upper end and the second fixer 102 formed at the lower end. A damper coupler 12*a* capable of being coupled to the upper ends of the dampers 100 is provided on the outer surface of the tub 12. The first fixer 101 of the damper 100 may be supported by the damper coupler 12*a* of the tub 12. The damper coupler 12*a* of the tub 12 may be provided to correspond to the first fixer 201 of the damper 100. The second fixer 102 of the damper 100 may be supported by a damper coupler 10*e* formed on the bottom plate 10*d*.

In the drawing, the first fixer 101 is shown at the upper end of the damper 100, and the second fixer 102 is shown at the lower end of the damper 100, but the spirit of the disclosure is not limited thereto. For example, the first fixer 101 may be provided at the lower end of the damper 100, and the second fixer 102 may be provided at the upper end of the damper 100.

Figure 3:
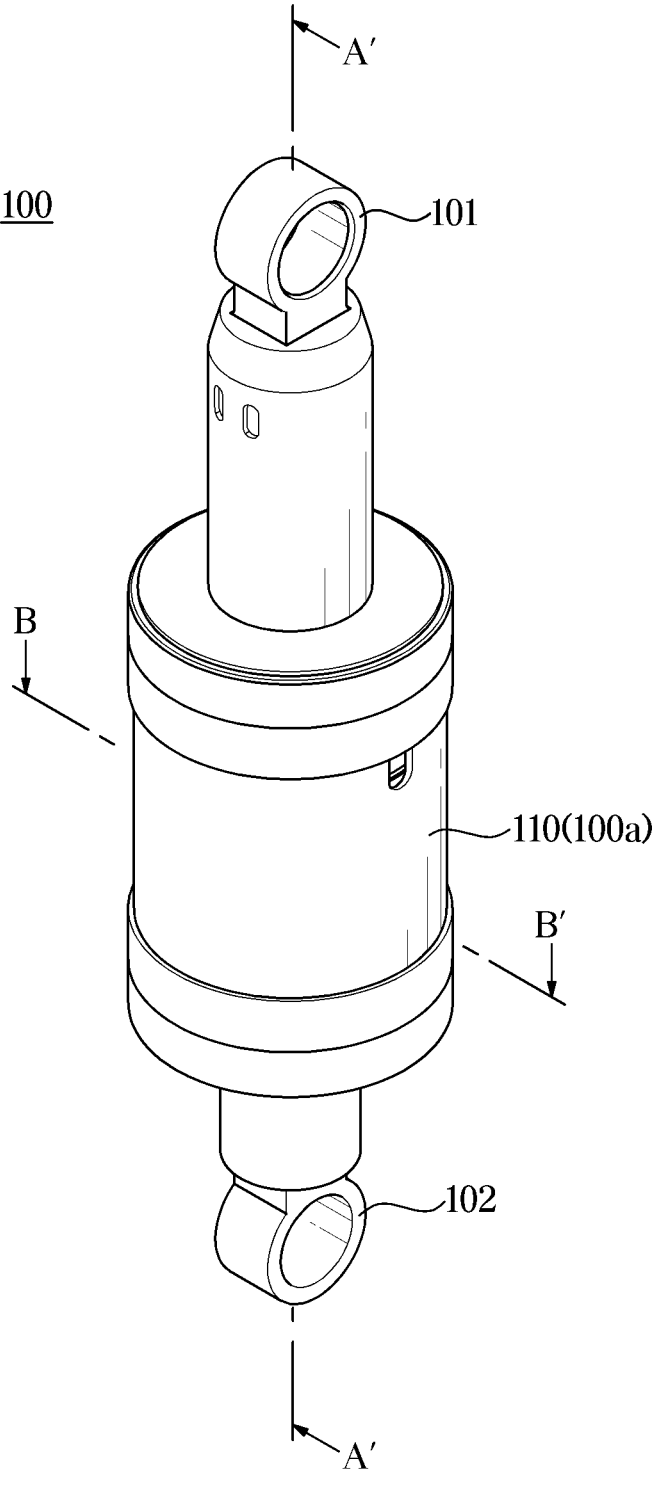
FIG. 3 is a perspective view of a damper in the washing machine shown in FIG. 2 according to an exemplary embodiment of the disclosure.
Figure 4:
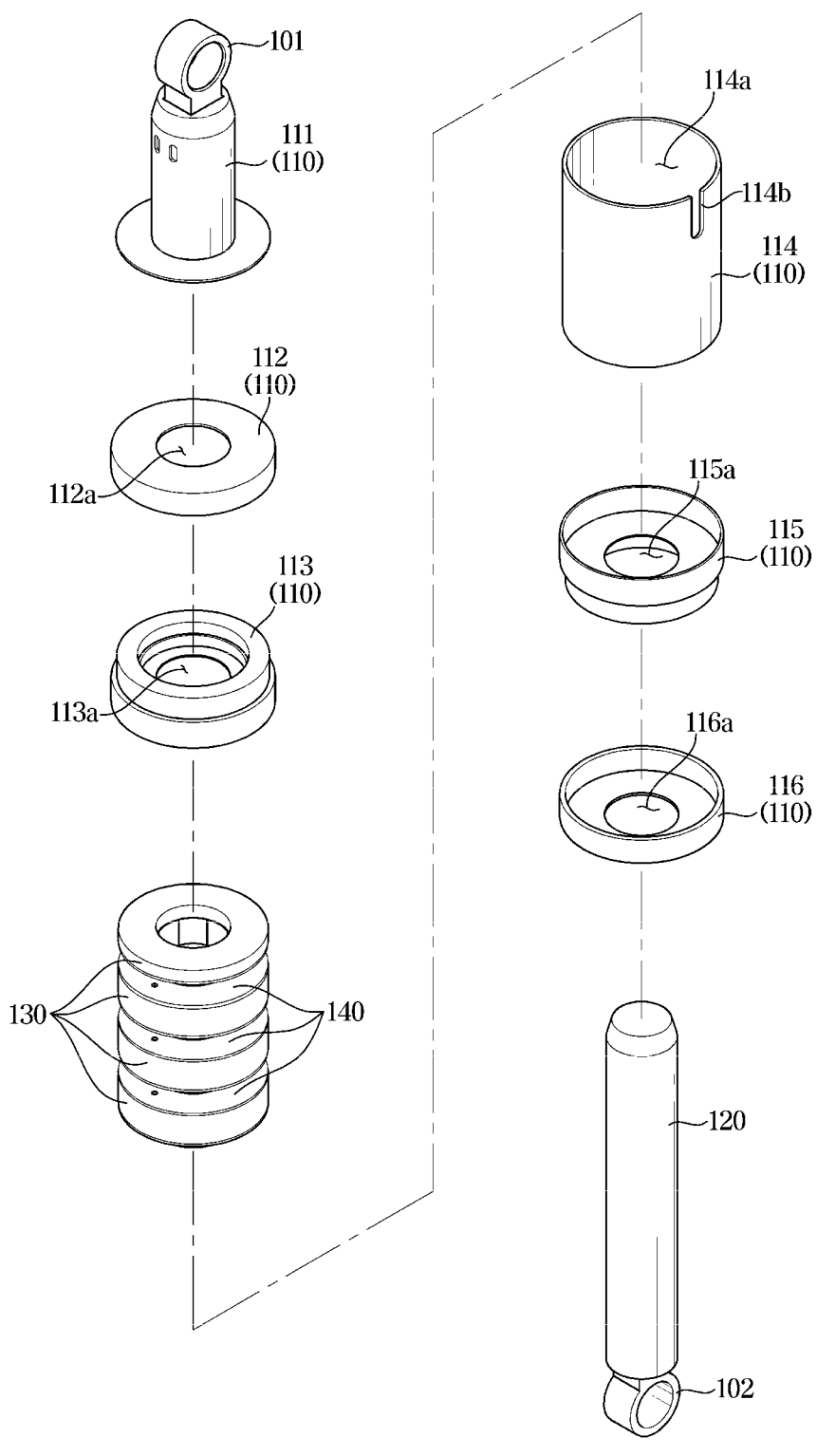
FIG. 4 is an exploded perspective view of the damper shown in FIG. 3 according to an exemplary embodiment of the disclosure.
Figure 5:
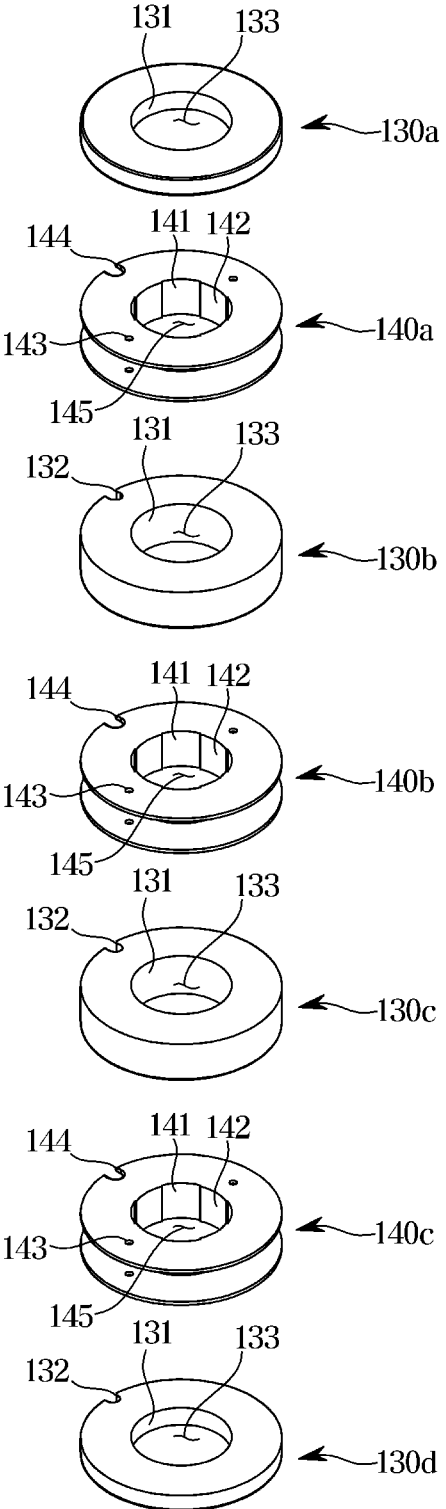
FIG. 5 is an exploded perspective view illustrating some components of the damper shown in FIG. 4 according to an exemplary embodiment of the disclosure.

FIG. 3 is a perspective view of a damper in the washing machine shown in FIG. 2. FIG. 4 is an exploded perspective view of the damper shown in FIG. 3. FIG. 5 is an exploded perspective view illustrating some components of the damper shown in FIG. 4.

Referring FIGS. 3 to 5, the washing machine 1 according to an embodiment of the disclosure includes a damper 100. The damper 100 may include a piston 120, a cylinder 100*a*, and a friction agent 160.

The piston 120 extends in one direction. The piston 120 is provided to be movable inside the cylinder 100*a*. The piston 120 may be referred to as a rod 120. In detail, while the piston 120 moves forward and backward in the inner space 100*b* of the cylinder 100*a*, the vibration of the tub 12 may be damped by friction between the piston 120 and the cylinder 100*a*.

One end of the piston 120 is provided with the second fixer 102. The second fixer 102 is formed at one end of the piston 120 that is not inserted into the inner space 100*b* of the cylinder 100*a*. The second fixer 102 may be fixed to the bottom plate. However, the present disclosure is not limited thereto, and the second fixer 102 may be fixed to the tub 12.

The cylinder 100*a* accommodates the piston 120, so that the piston 120 moves forward and backward in the cylinder 100*a*. In detail, the cylinder 100*a* includes the inner space 100*b*. The inner space 100*b* is formed inside the cylinder 100*a*. The cylinder 100*a* is provided to surround the piston 120.

The cylinder 100*a* further includes a case 110. The case 110 forms the exterior of the cylinder 100*a*. The case 110 may be referred to as a cylinder case 110.

The case 110 may be provided with a plurality of cases. For example, the plurality of cases 110 includes a first case 111, a second case 112, a third case 113, a fourth case 114, a fifth case 115 and a sixth case 116. The first case 111, the second case 112, the third case 113, the fourth case 114, the fifth case 115, and the sixth case 116 may be combined by various methods. For example, the first case 111, the second case 112, the third case 113, the fourth case 114, the fifth case 115 and the sixth case 116 may be welded, screw-coupled, or fitted into another case 110 by bending a portion of each case 110.

In the drawings, the first case 111, the second case 112, the third case 113, the fourth case 114, the fifth case 115, and the sixth case 116 is shown as a separate component, but the spirit of the disclosure is not limited thereto, accordingly, the first case 111, the second case 112, the third case 113, the fourth case 114, the fifth case 115, and the sixth case 116 may be integrally formed.

The first case 111 is disposed at one end of the cylinder case 110. The first case 111 may be coupled to the second case 112. The first fixer 101 is formed at one end of the first case 111. The first case 111 accommodates a portion of the piston 120 therein.

The second case 112 may be coupled to the first case 111. The second case 112 may cover a portion of the third case 113 and the piston 120. For example, the piston 120 is inserted into a hollow portion 112*a* of the second case 112.

The third case 113 may be coupled to the second case 112 and the fourth case 114. The third case 113 surrounds a portion of the piston 120 and accommodates the sealing member 170. In detail, the piston 120 is inserted into a hollow portion 113*a* of the third case 113.

The fourth case 114 may be coupled to the second case 112 or the fifth case 115. The fourth case 114 includes an accommodation space 114*a* and a guide hole 114*b*. The fourth case 114 covers a bobbin 140, a yoke 130, and a portion of the piston 120. The bobbin 140, the yoke 130, and the piston 120 are positioned in an accommodation space 114*a*. The guide hole 114*b* may guide a coil 150 as the coil 150 is wound around the bobbin 140 to be described later. The guide hole 114*b* extends from one end of the wall of the fourth case 114.

The fifth case 115 may be coupled to the fourth case 114 and the sixth case 116. The fifth case 115 surrounds a portion of the piston 120 and accommodates the sealing member 170. In detail, the piston 120 in inserted into a hollow portion 115*a* of the fifth case 115.

The sixth case 116 is disposed at the other end of the cylinder case 110. The sixth case 116 may be coupled to the fifth case 115. The sixth case 116 accommodates a portion of the piston 120 therein. In detail, the piston 120 is inserted into a hollow portion 116*a* of the sixth case 116.

The cylinder 100*a* further includes the yoke 130 and the bobbin 140.

The yoke 130 interacts with the friction agent 160 including a magneto-rheological fluid to be described later. Friction occurs between the cylinder 100*a* and the piston 120 due to the interaction between the yoke 130 and the magneto-rheological fluid. Therefore, the yoke 130 may be a magnetic material.

The yoke 130 may be hollow to form an inner space 100*b* of the cylinder 100*a*. For example, the yoke 130 includes a hollow portion 133. The hollow portion 133 is formed by an inner surface 131. The hollow portion 133 may be referred to as an inner space 133 of the yoke 130. For example, the inner space 100*b* of the cylinder 100*a* may include the hollow portion 133 of the yoke 130. The piston 120 may be accommodated and/or inserted into the hollow portion 133.

The yoke 130 may be provided in plurality. The plurality of yokes 130 includes a first yoke 130*a*, a second yoke 130*b*, a third yoke 130c, and a fourth yoke 130d. The bobbin 140 is disposed between the yokes 130. For example, the first bobbin 140a is disposed between the first yoke 130a and the second yoke 130b, the second bobbin 140a is disposed between the second yoke 130b and the third yoke 130c, and the third bobbin 140c is disposed between the third yoke 130c and the fourth yoke 130d.

The yoke 130 may further include a coil guide 132 and a coupling protrusion (not shown). The coil guide 132 guides the coil 150 wound around the bobbin 140. The coil guide 132 is provided in a shape recessed inward along the radial direction of the yoke 130 from the outer circumferential surface of the yoke 130. The coupling protrusion may couple the bobbin 140 and the yoke 130 to each other. For example, the bobbin 140 and the yoke 130 may be coupled to each other due to the coupling portion formed on the bobbin 140 and the coupling protrusion formed on the yoke 130.

Although the coil guide 132 is shown only in the second yoke 130b and the third yoke 130c in the drawing, the formation position of the coil guide 132 is not limited thereto. Also, the coil guide 132 and the coupling protrusion may be optional components. For example, the coil guide 132 and the coupling protrusion may be omitted.

The bobbin 140 is disposed between the yokes 130 to space the plurality of yokes 130 apart. The coil 150 may be wound around the bobbin 140. For example, the coil 150 is wound around a connecting surface 147 of the bobbin 140 (refer to FIG. 6). The bobbin 140 may be a non-magnetic material. For example, the bobbin 140 may be a plastic injection molding product.

The bobbin 140 may be hollow to form the inner space 100b of the cylinder 100a. For example, the bobbin 140 includes a hollow portion 145. The hollow portion 145 is formed by an inner surface 141. The hollow portion 145 may be referred to as an inner space 145 of the bobbin 140. For example, the inner space 100b of the cylinder 100a may include the hollow part 145 of the bobbin 140. The piston 120 may be accommodated and/or inserted into the hollow portion 145.

The bobbin 140 may be provided with a plurality of bobbins. The plurality of bobbins 140 includes a first bobbin 140a, a second bobbin 140b, and a third bobbin 140c. Each of the plurality of bobbins 140 is disposed between the yokes 130.

The bobbin 140 further includes a hollow protrusion 142. The hollow protrusion 142 protrudes from the inner surface 141 forming the hollow portion 145 of the bobbin 140 in the radial direction. The hollow protrusion 142 protrudes toward the center of the hollow portion 145. The amount of the friction agent 160 provided between the hollow protrusion 142 and the piston 120 due to the hollow protrusion 142 is less than the amount of the friction agent 160 provided between the inner surface 141 of the bobbin 140 and the piston 120 in which the hollow protrusion 142 is not formed. Details will be described later.

The bobbin 140 further include the coil guide 144. The coil guide 144 may guide the coil 150 wound around the outer periphery of the connecting surface 147. The coil guide 144 is recessed inward along the radial direction of the bobbin 140 and/or the cylinder 100a from the outer circumferential surface of a support plate 146 (see FIG. 6).

The bobbin 140 may further include a coupling part. The coupling part may couple the bobbin 140 and the yoke 130 to each other. For example, the bobbin 140 and the yoke 130 may be coupled to each other due to the coupling part formed on the bobbin 140 and the coupling protrusion formed on the yoke 130. For example, the bobbin 140 may include a hole or groove.

The hollow protrusion 142, the coil guide 144, and the coupling part may be optional components. For example, the hollow protrusion 142, the coil guide 144, and the coupling part may be omitted.

The friction agent 160 may include a magneto-rheological fluid. Details will be described later.

Figure 6:
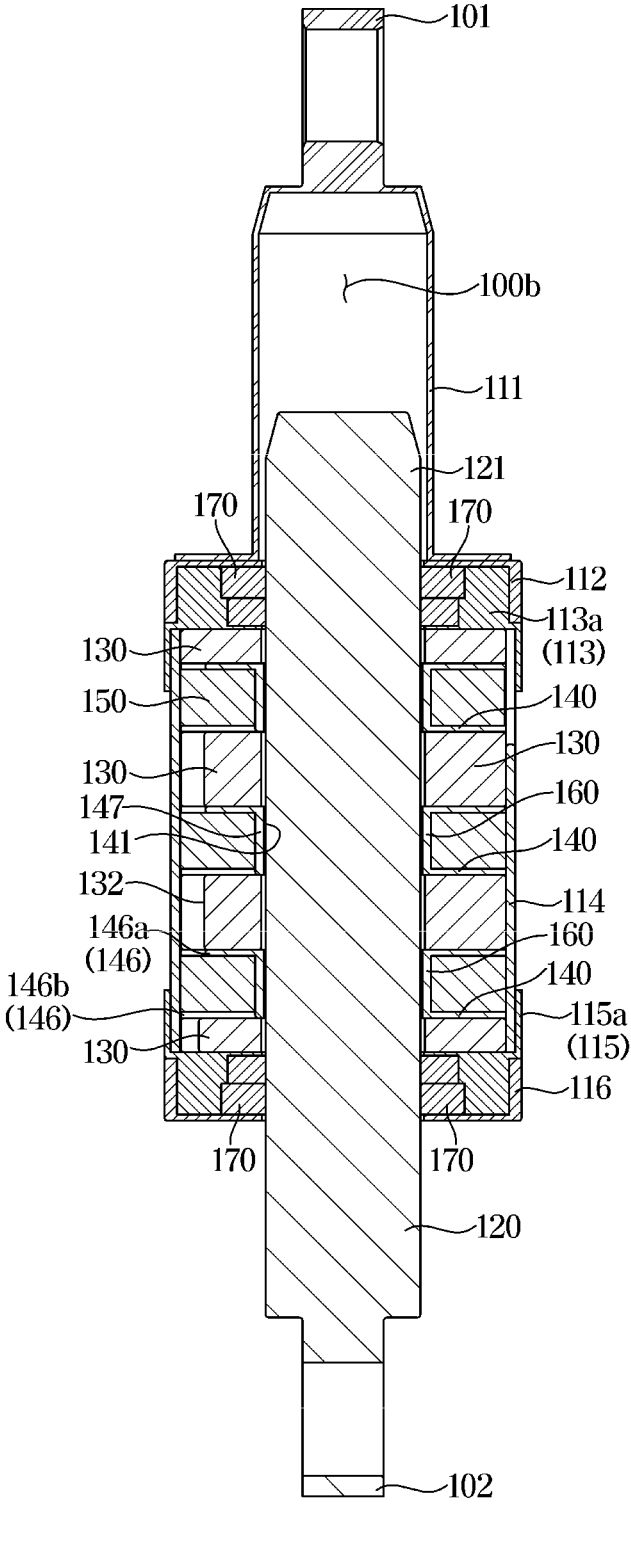
FIG. 6 is a cross-sectional view of the damper shown in FIG. 3 according to an exemplary embodiment of the disclosure.
Figure 7:
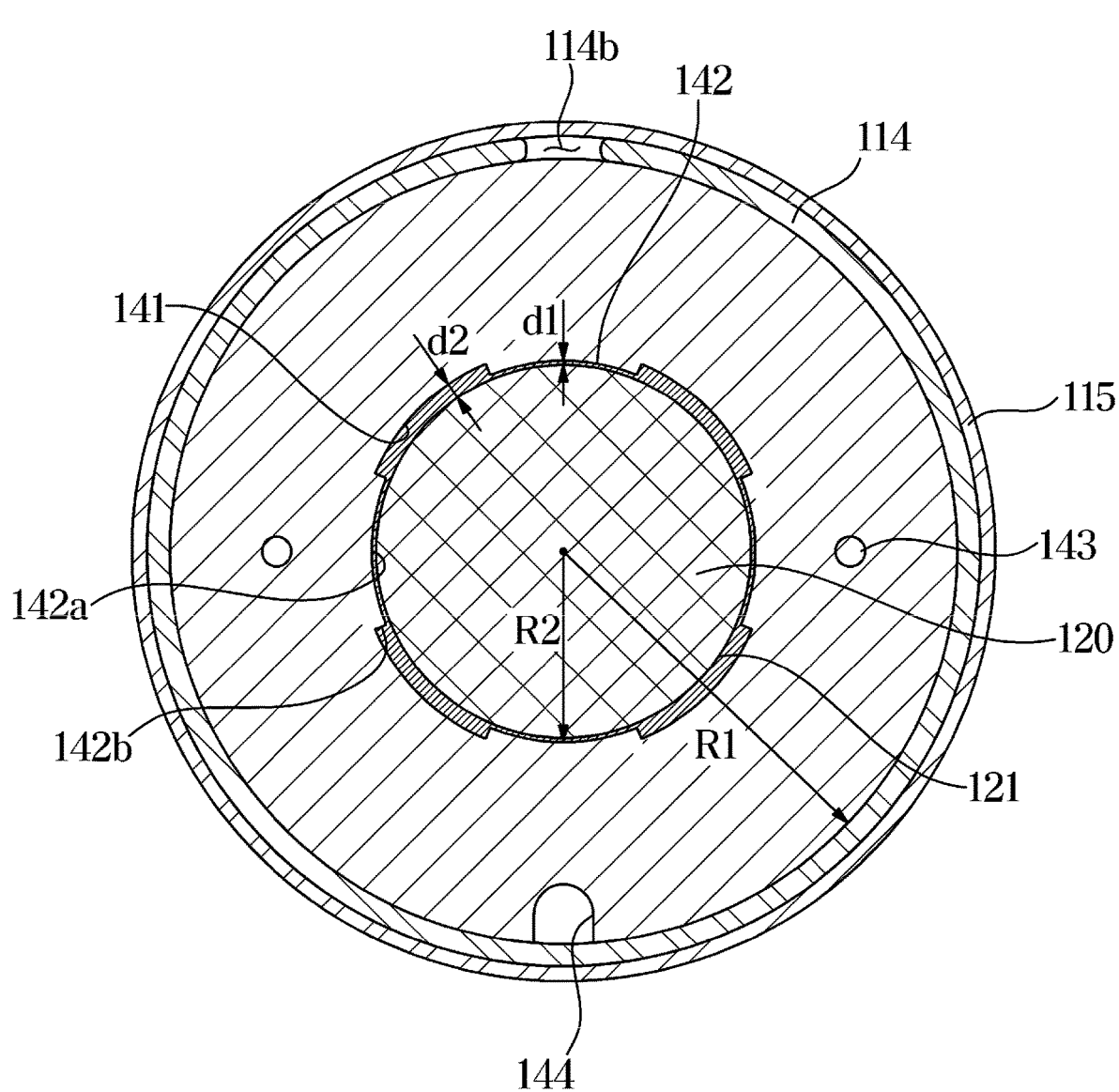
FIG. 7 is a cross-sectional view of the damper shown in FIG. 3 according to an exemplary embodiment of the disclosure.

FIG. 6 is a cross-sectional view of the damper shown in FIG. 3. FIG. 7 is a cross-sectional view of the damper shown in FIG. 3.

Referring to FIGS. 6 and 7, the washing machine 1 according to an embodiment includes the damper 100. The damper 100 includes the cylinder 100a, the piston 120, the coil 150, and the friction agent 160.

The cylinder 100a includes the bobbin 140 and the yoke 130. The bobbin 140 includes the support plate 146, the connecting surface 147, and the hollow protrusion 142.

The support plate 146 is disposed between the yokes 130 to support the plurality of yokes 130. The support plate 146 may be provided in plurality. For example, a first support plate 146a contacts the yoke 130 disposed on one side of the bobbin 140 in the longitudinal direction (and/or extension direction) of the piston 120 to support the yoke 130, and a second support plate 146b supports the yoke 130 in contact with the yoke 130 disposed on the other side of the bobbin 140 in the longitudinal direction of the piston 120. The support plate 146 may be referred to as a contact plate 146.

The connecting surface 147 is disposed between the support plates 146. For example, the connecting surface 147 is disposed between the first support plate 146a and the second support plate 146b to extend along the longitudinal direction (and/or the extension direction) of the piston 120. The radius R2 of the connecting surface 147 is provided to be smaller than the radius R1 of the support plate 146. For example, the connecting surface 147 may connect the middle portions of the plurality of support plates 146 to each other. The coil 150 may be wound on the connecting surface 147.

The hollow protrusion 142 protrudes from the inner surface 141 of the bobbin 140 toward the piston 120. For example, the hollow protrusion 142 protrudes from the inner surface 141 of the bobbin 140 toward the hollow portion 145 along the radial direction of the bobbin 140.

The hollow protrusion 142 may be provided in plurality. The plurality of hollow protrusions 142 may protrude in a direction facing each other. However, the present disclosure is not limited thereto, and the plurality of hollow protrusions 142 may protrude so as not to face each other.

The hollow protrusion 142 includes a protruding surface 142a and a connection surface 142b. The protruding surface 142a protrudes from the inner surface 141 of the bobbin 140. For example, the protruding surface 142a has a step difference from the inner surface 141 of the bobbin 140. The connection surface 142b connects the protruding surface 142a to the inner surface 141 of the bobbin 140. The connection surface 142b is provided on both sides of the protruding surface 142a.

The coil 150 may surround the outer periphery of the bobbin 140. For example, the coil 150 may surround the connecting surface 147. The coil 150 may be disposed between the support plates 146. Since a magnetic field is formed when a current is applied to the coil 150, the viscosity and friction force of the friction agent 160 including the magneto-rheological fluid may change.

The friction agent 160 is disposed between the cylinder 100a and the piston 120 and can reduce vibration generated from the rotating drum 11 during the operation of the washing machine 1 by the frictional force between the cylinder 100a and the piston 120. In detail, the friction agent 160 is disposed between the outer surface 121 of the piston 120 and the inner surface of the cylinder 100a.

The friction agent 160 may include the magneto-rheological fluid. When current flows in the coil 150 wound around the bobbin 140, magnetic field is generated, and the magneto-rheological fluid changes in viscosity by the magnetic field. For example, when the drum 11 rotates at a low speed, current may be applied to the coil 150 to increase the viscosity of the magneto-rheological fluid, and accordingly, the friction force of the friction agent 160 may increase. Conversely, when the drum 11 rotates at a high speed, the viscosity of the magneto-rheological fluid is low because no current is applied to the coil 150, and thus the frictional force of the friction agent 160 may reduce.

However, in the region where the magnetic field is formed by the coil 150, the viscosity of the magneto-rheological fluid changes, but in the region where the magnetic field is not formed, the viscosity of the magneto-rheological fluid may not change, so it may not affect the frictional force. Therefore, it is possible to arrange a large amount of the friction agent 160 including the magneto-rheological fluid in the region where a magnetic field is formed, and a small amount of the friction agent 160 in the region where a magnetic field is not formed.

The friction agent 160 is disposed between the protruding surface 142a and the outer surface 121 of the piston 120 and/or between the inner surface 141 of the bobbin 140 and the outer surface 121 of the piston 120. For example, a portion of the friction agent 160 is disposed between the protruding surface 142a and the outer surface 121 of the piston 120, and another portion of the friction agent 160 is disposed between the inner surface 141 of the bobbin 140 and the outer surface 121 of the piston 120. In this case, the magnetic field may be mainly generated between the yoke 130 and the piston 120. Accordingly, a small amount of the friction agent 160 including the magneto-rheological fluid may be disposed between the bobbin 140 and the piston 120, which is an area in which the magnetic field is not formed or the magnetic field is low. In other words, the amount of friction agent 160 disposed between the protruding surface 142a and the outer surface 121 of the piston 120 may be less than the amount of the friction agent 160 disposed between the inner surface 141 of the bobbin 140 and the outer surface 121 of the piston 120. In addition, the ratio of the length and/or thickness from the protruding surface 142a to the outer surface 121 of the piston 120 and the length and/or thickness from the inner surface 141 of the bobbin 140 to the outer surface 121 of the piston 120 may be 1:2.4. However, the above ratio is not limited thereto.

Therefore, it is possible to reduce the amount of the friction agent 160 containing the magneto-rheological fluid while maintaining the same damping force. Since the magneto-rheological fluid is expensive, the production cost and/or the manufacturing cost of the damper 100 can be reduced, and consequently the production cost and/or the manufacturing cost of the washing machine 1 can be saved.

The damper 100 further includes a sealing member 170. The sealing member 170 is accommodated in the case. The sealing member 170 seals the space between the piston 120 and the cylinder 100a. Specifically, the sealing member 170 is disposed between the piston 120 and the third case 113 and/or between the piston 120 and the fifth case 115. The sealing members 170 may be provided with a plurality of sealing members 170.

Figure 8:
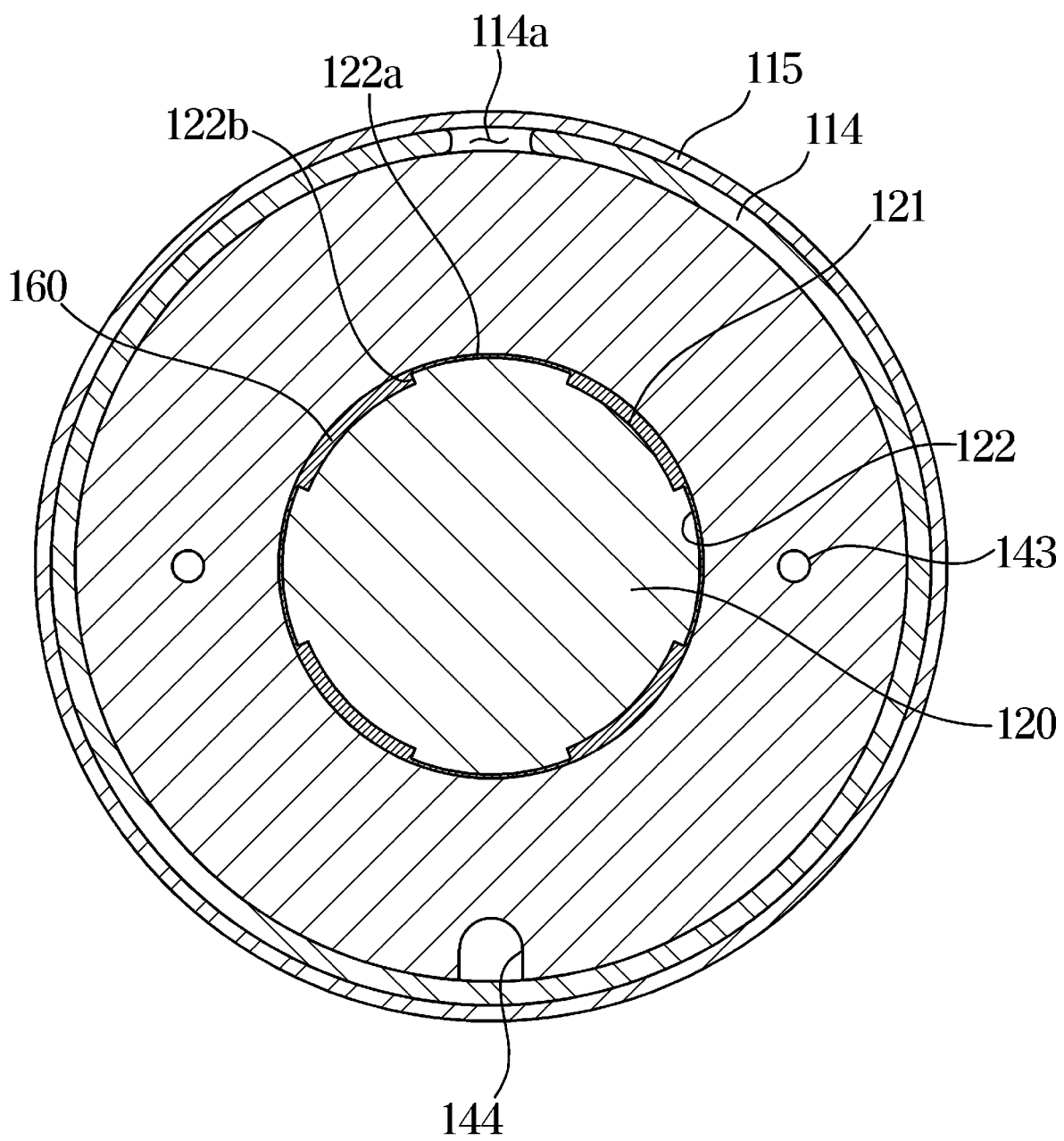
FIG. 8 is a cross-sectional view of a damper of a washing machine according to an exemplary embodiment of the disclosure.

FIG. 8 is a cross-sectional view of a damper of a washing machine according to an embodiment of the present disclosure.

Referring to FIG. 8, the damper 100 according to an embodiment includes the piston 120, the cylinder 100a, and the friction agent 160. The piston 120 includes a radial protrusion 122. The cylinder 100a includes the bobbin 140.

The radial protrusion 122 protrudes from the piston 120 toward the bobbin 140. In detail, the radial protrusion 122 protrudes from the outer surface 121 of the piston 120 toward the inner surface 141 of the bobbin 140 along the radial direction of the piston 120.

The radial protrusion 122 may be provided in plurality. The plurality of radial protrusions 122 may protrude in opposite directions. However, the present disclosure is not limited thereto.

The radial protrusion 122 includes a protruding surface 122a and a connection surface 122b. The protruding surface 122a protrudes from the outer surface 121 of the piston 120. For example, the protruding surface 122a has a step difference from the outer surface 121 of the piston 120. The connection surface 122b connects the protrusion surface 122a and the outer surface 121 of the piston 120 to each other. The connection surface 122b is provided on both sides of the protruding surface 122a.

The friction agent 160 is disposed between the cylinder 100a and the piston 120 and can reduce vibration generated from the rotating drum 11 during the operation of the washing machine 1 by the frictional force between the cylinder 100a and the piston 120. In detail, the friction agent 160 is disposed between the outer surface 121 of the piston 120 and the inner surface of the cylinder 100a.

The friction agent 160 is disposed between the protruding surface 122a and the inner surface 141 of the bobbin 140 and/or between the outer surface 121 of the piston 120 and the inner surface 141 of the bobbin 140. For example, a portion of the friction agent 160 is disposed between the protruding surface 122a and the inner surface 141 of the bobbin 140, and another portion of the friction agent 160 is disposed between the outer surface 121 of the piston 120 and the inner surface 141 of the bobbin 140. In this case, the amount of friction agent 160 disposed between the protruding surface 122a and the inner surface 141 of the bobbin 140 is less than the amount of friction agent 160 disposed between the outer surface 121 of the piston 120 and the inner surface 141 of the bobbin 140. In addition, the length and/or thickness from the protrusion surface 122a to the inner surface 141 of the bobbin 140 is shorter than the length and/or thickness from the inner surface 141 of the bobbin 140 to the outer surface 121 of the piston 120.

Therefore, it is possible to reduce the amount of the friction agent 160 containing the magneto-rheological fluid while maintaining the same damping force. Since the magneto-rheological fluid is expensive, the production cost and/or the manufacturing cost of the damper 100 can be reduced, and consequently the production cost and/or the manufacturing cost of the washing machine 1 can be reduced.

Figure 9:
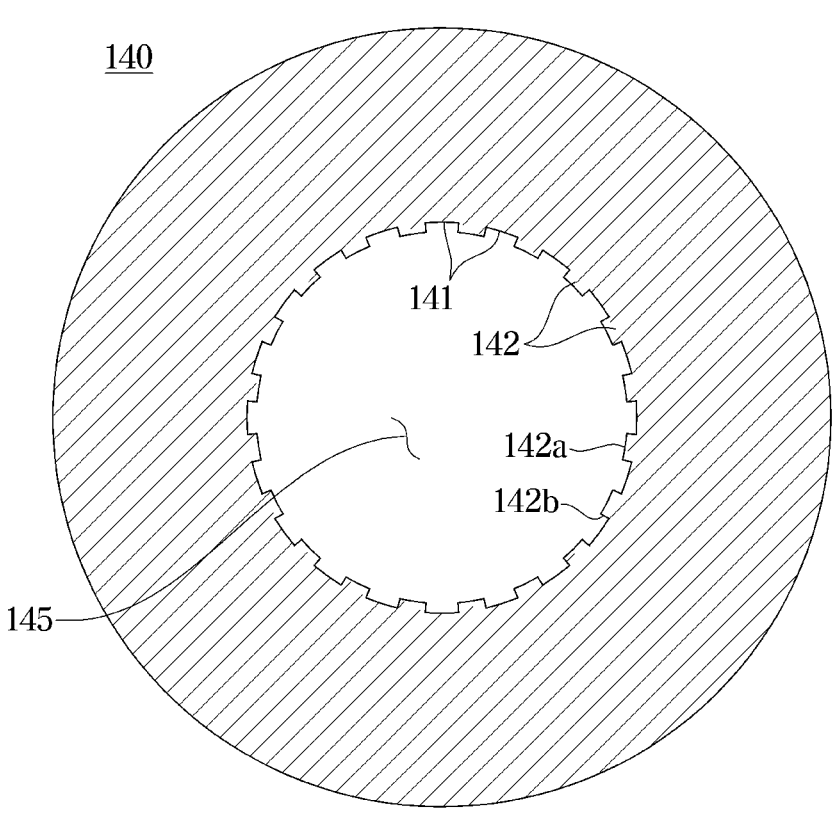
FIG. 9 is a cross-sectional view of a damper of a washing machine according to an exemplary embodiment of the disclosure.

FIG. 9 is a cross-sectional view of a damper of a washing machine according to an embodiment of the present disclosure.

Referring to FIG. 9, the damper 100 according to an embodiment includes the bobbin 140. The bobbin 140 includes a plurality of hollow protrusions 142. In FIG. 7, the hollow protrusion 142 is shown as four, but is not limited thereto. Since the number of hollow protrusions 142 is increased, it is possible to reduce the amount of friction agent 160 disposed between the piston 120 and the bobbin 140 while maintaining the same damping force.

Figure 10:
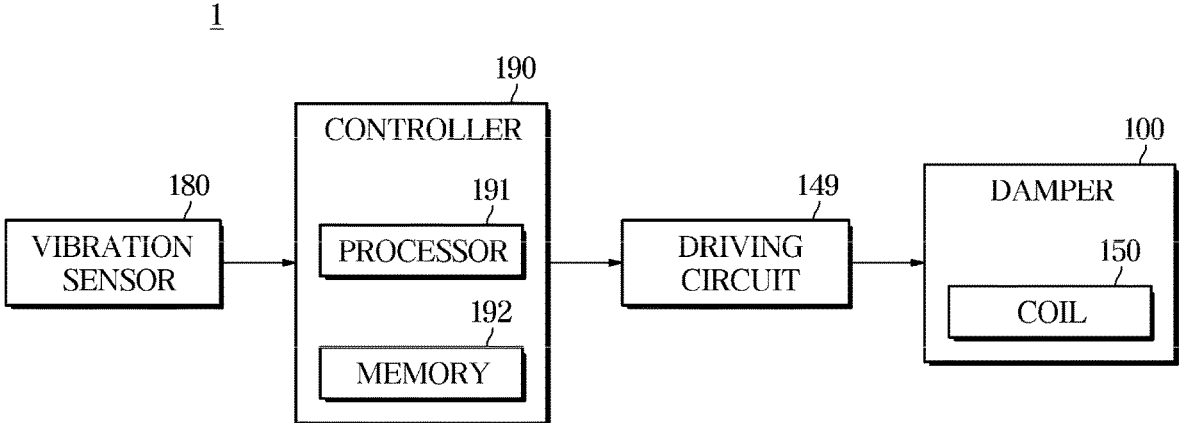
FIG. 10 is a block diagram illustrating the configuration of a washing machine according to an exemplary embodiment of the disclosure.

FIG. 10 is a block diagram illustrating the configuration of a washing machine according to an embodiment of the present disclosure.

Referring to FIG. 10, the washing machine 1 according to an embodiment includes a vibration sensor 180 for detecting the vibration value of the tub 12, a controller 190 electrically connected to components of the washing machine 1 to control the operation of each component, and at least one damper 100 coupled to the cabinet 10 and the tub 12 to reduce vibration of the tub 12.

The vibration sensor 180 may sense the vibration of the tub 12. Specifically, the vibration sensor 180 senses the vibration of the tub 12 generated by the rotation of the drum 11 during the washing cycle (e.g. a spin-dry process). An eccentricity of the drum 11 may occur due to unbalance of laundry disposed inside the drum 11, and the vibration of the tub 12 may occur due to the eccentricity of the drum 11. When the rotation speed of the drum 11 increases in a state in which the laundry is unbalanced, the vibration of the tub 12 may also increase, and noise caused by the vibration of the tub 12 may also increase.

The vibration sensor 180 may output a vibration signal related to the vibration of the tub 12. The amplitude of the vibration signal may be defined as a vibration value when the tub 12 vibrates.

In an embodiment, the controller 190 may convert a time domain vibration signal output from the vibration sensor 180 into a frequency domain vibration signal, and process the frequency domain vibration signal.

According to various embodiments, the vibration sensor 180 may include a 6-axis sensor capable of detecting displacement of 6 axes (X, Y, Z, Pitch, Roll, and Yaw).

In an embodiment, the controller 190 may determine the vibration value generated at the front side of the tub 12 and the vibration value generated at the rear side of the tub 12 based on the 6-axis displacement (vibration value of the tub) sensed by the vibration sensor 180.

A method of estimating the vibration value generated from the front side of the tub 12 and the vibration value generated from the rear side of the tub 12 based on the displacement of the 6-axis sensor may include various methods known to those skilled in the art.

According to various embodiments, the vibration sensor 180 may be implemented as a driving unit for rotating the drum 11.

Specifically, the driving unit may indirectly detect the vibration of the tub 12 based on a driving current value for driving the motor, a driving voltage for driving the motor, and/or the speed of a rotor of the motor.

The driving unit may determine the vibration value of the tub 12 based on the driving current value for driving the motor, the driving voltage for driving the motor, and/or the speed of the rotor of the motor, and transmit information on the determined vibration value to the controller 190.

That is, the vibration sensor 180 may be implemented as a separate sensor for directly measuring the vibration of the tub 12 or as a driving unit for rotating the drum 11.

The controller 190 may include a processor 191 that generates control signals related to the operation of the washing machine 1 and a memory 192 that stores programs, applications, instructions, and/or data for the operation of the washing machine 1. The processor 191 and the memory 192 may be implemented as separate semiconductor elements or as a single semiconductor element. Also, the controller 190 may include a plurality of processors or a plurality of memories. The controller 190 may be provided in various locations inside the washing machine 1. For example, the controller 190 may be included in a printed circuit board provided inside the control panel 14.

The processor 191 may include an arithmetic circuit, a memory circuit, and a control circuit. The processor 191 may include one chip or a plurality of chips. Also, the processor 191 may include one core or a plurality of cores.

The memory 192 may store a program for performing the washing cycle according to a washing course and data including washing settings according to the washing course. Also, the memory 192 may store a currently selected washing course and washing settings (e.g. spin-dry mode) based on a user input.

In an embodiment, the memory 192 may store an algorithm for performing the washing cycle according to the washing course and washing settings, drum speed profile data for controlling the speed of the drum 11 during the spin-dry process, and a look-up table for controlling the damping force of the damper 100 based on the vibration value of the tub 12.

The memory 192 may include volatile memories such as Static Random Access Memory (S-RAM) and Dynamic Random Access Memory (D-RAM), and non-volatile memories such as Read Only Memory (ROM) and Erasable Programmable Read Only Memory (EPROM). The memory 192 may include one memory element or a plurality of memory elements.

The processor 191 may process data and/or signals using a program provided from the memory 192 and transmit a control signal to each component of the washing machine 1 based on the processing result. For example, the processor 191 may process a user input received through the control panel 14. The processor 191 may output the control signal to control the driving circuit 149 for adjusting the voltage applied to the control panel 14, the motor for rotating the drum 11, the water supply valve, the drain pump, and the coil 150 of the damper 100 in response to the user input.

As another example, the processor 191 may control the damping force of the damper 100 based on the vibration value in a pre-set section of the washing cycle by using the program provided from the memory 192.

The processor 191 may control the voltage applied to the driving unit for rotating the drum 11, the water supply valve, the drain pump, and the coil 150 of the damper 100 to perform the washing cycle consisting of the washing process, rinsing process, and spin-dry process.

As described above, the damper 100 includes the piston 120, the cylinder 100a, the friction agent 160, and the at least one coil 150 generating magnetic field.

The at least one coil 150 generates magnetic field when voltage is applied from the driving circuit 149. The viscosity of the friction agent 160 changes depending on the magnetic field generated by the at least one coil 150, and thus the damping force of the damper 100 changes.

For example, as the magnetic field generated by the at least one coil 150 becomes stronger, the frictional force of the friction agent 160 increases, and thus the damping force of the damper 100 can increase.

The driving circuit 149 may include a power supply unit that supplies the pre-set voltage (e.g., 12V) and at least one switch that cuts off power supplied from the power supply unit or supplies power supplied from the power unit to the at least one coil 150.

The driving circuit 149 may supply the pre-set voltage to the at least one coil 150 or block the voltage supplied to the at least one coil 150 based on the control signal of the controller 190.

The controller 190 may control the duty ratio of the voltage supplied to the at least one coil 150 by applying a driving signal to the driving circuit 149.

That is, the controller 190 may control the driving circuit 149 to adjust the duty ratio of the voltage applied to the at least one coil 150.

The duty ratio of the voltage supplied to the at least one coil 150 may be an on-off ratio of the at least one switch that blocks power supplied from the power supply unit or supplies power supplied from the power supply unit to the at least one coil 150.

That is, the duty ratio of the voltage supplied to the at least one coil 150 may mean the ratio of the period during which the voltage is supplied to the at least one coil 150 and the period during which no voltage is supplied to the at least one coil 150. For example, when the duty ratio of the voltage applied to the at least one coil 150 is adjusted to 40%, the driving circuit 149 applies the voltage to the at least one coil 150 for the first period, does not apply the voltage for the second period, and repeats the first and second period. In this case, the ratio between the first and the second period is 4:6.

As the duty ratio of the voltage applied to the at least one coil 150 is changed, the damping force of the damper 100 may be changed.

The controller 190 may control the voltage applied to the at least one coil 150 based on the rotation speed of the drum 11 and the vibration value of the tub 12. That is, the controller 190 may control the damping force of the damper 100 based on the rotation speed of the drum 11 and the vibration value of the tub 12.

The method of controlling the voltage applied to the at least one coil 150 may be not only the method of controlling the duty ratio of the voltage applied to the at least one coil 150 described above, but also a multi-stage control method that supplies step-by-step power from different power sources described later.

According to the prior art, the damping force of the damper was controlled by a simple control method in which voltage is applied to the coil when the damping force of the damper needs to be increased, and no voltage is applied to the coil when the damping force of the damper needs to be decreased.

According to an embodiment of the present disclosure, the damping force of the damper 100 can be more efficiently controlled by adjusting the voltage applied to the at least one coil 150 using the duty ratio control method or multi-stage control method.

According to the present disclosure, by controlling the duty ratio of the voltage applied to the at least one coil 150, it is possible to secure the desired level of damping force.

An example of the method for the controller 190 to control the duty ratio of the voltage applied to the coil 150 based on the vibration value of the tub 12 will be described later with reference to FIGS. 11 to 13.

Figure 11:
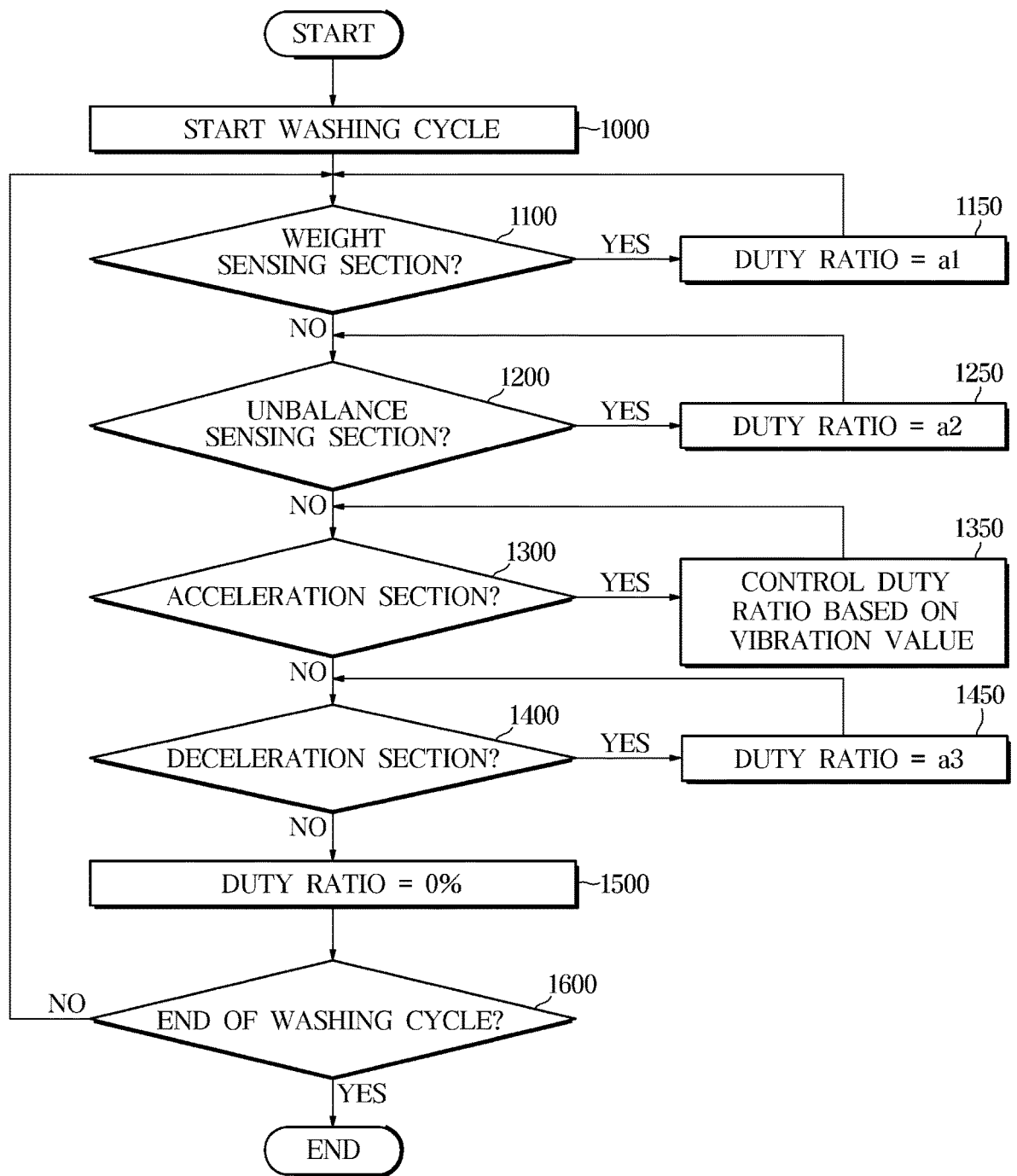
FIG. 11 is a flowchart illustrating an example of a method for controlling a washing machine according to an exemplary embodiment of the disclosure.

FIG. 11 is a flowchart illustrating an example of a method for controlling a washing machine according to an embodiment of the present disclosure. FIG. 12 illustrates an example of a drum speed profile of a washing machine according to an embodiment of the present disclosure. FIG. 13 illustrates an example of a lookup table for controlling the damping force of a damper based on the vibration value of a tub.

Referring to FIG. 11, the controller 190 may start the washing cycle based on receiving a command to start the washing cycle from a user through the control panel 14 (1000).

The controller 190 may control each component of the washing machine 1 to perform the washing cycle including the washing process, rinsing process, and spin-dry process according to the process conditions set by a user.

According to various embodiments, for more efficient washing, the washing cycle may further include a weight sensing process for detecting the weight of laundry and/or an unbalance sensing process for detecting an eccentric amount of laundry.

The controller 190 may control the driving unit so that the motor for rotating the drum 11 (hereinafter referred to as 'drum motor') is repeatedly turned on/off to perform the weight sensing process, and measure the load (weight of laundry) inside the drum 11 based on the counter electromotive force value generated in case that the drum motor is turned off. As another example, the controller 190 may provide a target speed command for rotating the drum 11 at the first target speed to the drive unit, and measure the load (weight of laundry) inside the drum 11 based on the time required for the drum 11 to reach the first target speed.

The weight sensing process may be performed before starting the washing process, but the execution timing of the weight sensing process is not limited thereto.

For example, the weight sensing process may be performed to measure the weight of laundry subject to spin-drying after the spin-dry process starts.

The controller 190 may control the driving unit so that the drum motor rotates at a constant speed for a certain period of time to perform the unbalance sensing process, and may detect an unbalance value based on the value of driving current detected for the certain period of time.

According to various embodiments, the controller 190 may determine the unbalance value based on the ratio of the ripple value of the driving current detected for the certain period of time and an average value of the driving current.

The unbalance sensing process may be performed at the start of the spin-dry process, but the execution timing of the unbalance sensing process is not limited thereto.

The laundry is washed by the washing process. Specifically, foreign substances attached to the laundry are separated by a chemical action of detergent and/or a mechanical action such as falling.

The washing process may include supplying water to the tub 12, washing the laundry by rotating the drum 11 at low speed, draining water contained in the tub 12, and an intermediate spin-dry that separates water from the laundry by rotating the drum 11 at high speed.

For washing, the controller 190 controls the driving unit to rotate the drum motor in a forward or reverse direction. By the rotation of the drum 11, the laundry falls from the upper side to the lower side of the drum 11, and the laundry can be washed by the fall.

For intermediate spin-dry, the controller 190 controls the driving unit to rotate the drum motor at high speed. By the high speed rotation of the drum 11, water is separated from the laundry contained in the drum 11 and discharged to the outside of the washing machine 1.

During the intermediate spin-dry, the rotation speed of the drum 11 may increase stepwise. For example, the controller 190 may control the driving unit to rotate the drum motor at the first rotation speed and control the drum motor so that the rotation speed of the drum motor increases to the second rotation speed based on change in driving current of the drum motor while the drum motor rotates at the first rotation speed. While the drum motor rotates at the first rotation speed, the controller 190 may control the drum motor to increase the rotation speed of the drum motor to the third rotation speed based on the change in driving current of the drum motor or reduce the rotation speed of the drum motor to the first rotation speed.

By means of the rinsing process, the laundry is rinsed. Specifically, detergents or foreign substances left in the laundry are washed away with water.

The rinsing process may include supplying water to the tub 12, rinsing by driving the drum 11 to rinse the laundry, draining water contained in the tub 12, and the Intermediate spin-dry by driving the drum 11 to separate water from the laundry.

The water supply, drainage, and the intermediate spin-dry of the rinsing process may be the same as the water supply, drainage, and the intermediate spin-dry of the washing process, respectively. The water supply, rinsing, drainage, and the intermediate spin-dry may be performed one time or several times during the rinsing process.

By means of the spin-dry process, the laundry is spin-dried. Specifically, water is separated from the laundry by the high speed rotation of the drum 11, and the separated water is discharged to the outside of the washing machine 1.

The spin-dry process may include final spin-dry in which water is separated from the laundry by rotating the drum 11 at high speed. Due to the final spin-dry, the last intermediate spin-dry of the rinsing process may be omitted.

For the final spin-dry, the controller 190 may control the driving unit to rotate the drum motor at high speed. By the high speed rotation of the drum 11, water is separated from the laundry contained in the drum 11, and is discharged to the outside of the washing machine 1. Also, the rotation speed of the drum motor may be increased stepwise.

Since the operation of the washing machine 1 is terminated by the final spin-dry, the execution time of the final spin-dry 1031 may be longer than the execution time of the intermediate spin-dry.

As described above, the washing machine 1 performs the washing cycle to wash the laundry. In particular, during the intermediate spin-dry and the final spin-dry, the washing machine 1 may increase the rotation speed of the drum motor step by step, and increase or reduce the rotational speed of the drum motor based on the change in the driving current of the drum motor.

A process in which relatively large vibration occurs in the tub 12 may be a spin-dry process in which the drum 11 is rotated from the low speed to the high speed.

Accordingly, the controller 190 needs to reduce the vibration of the tub 12 by controlling the damping force of the damper 100 during the spin-dry process in the washing cycle.

Hereinafter, the control method of the washing machine 1 for reducing vibration of the tub 12 during the spin-dry process will be described, but those skilled in the art will easily recognize that the technical idea to be described later may also be applied to the washing process and rinsing process.

The spin-dry process described later may include the intermediate spin-dry performed in the washing process, the intermediate spin-dry performed in the rinsing process, and the spin-dry process performed after the rinsing process.

Figure 12:
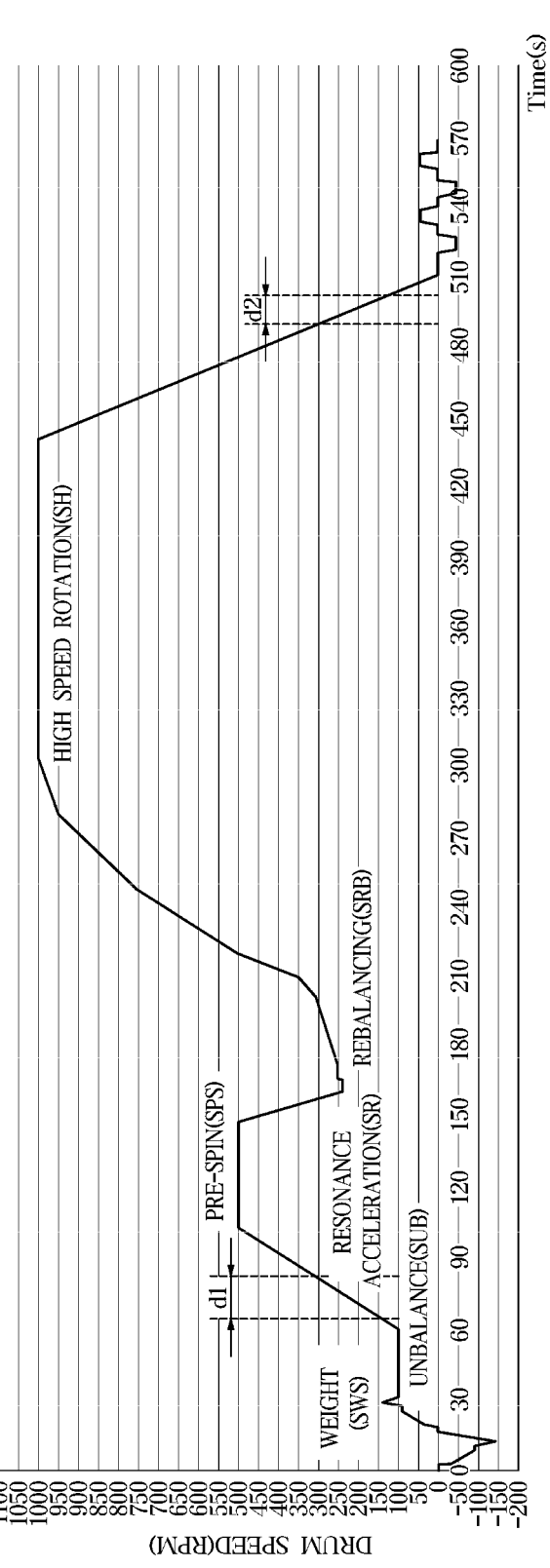
FIG. 12 shows an example of the drum speed profile of a washing machine according to an exemplary embodiment of the disclosure.

Referring to FIG. 12, the spin-dry process may include a weight sensing section (SWS) for detecting the weight of the laundry, an unbalance sensing section (SUB) for detecting the eccentricity of the laundry, a resonance acceleration section (SR) that vibration caused by rotation of the drum 11 is generated, a pre-spin section (SPS) for preliminary spin-dry rotation, a rebalancing section (SRB) for evenly distributing the laundry within the drum 11, and a high speed rotation section (SH) for main spin-dry rotation.

In the resonance acceleration section SR, the controller 190 may accelerate the drum 11 from the first reference speed (e.g., about 120 RPM) to the third reference speed (e.g., about 500 RPM).

In the resonance acceleration section SR, since the frequency of vibration generated by the low speed rotation of the drum 11 coincides with the resonance frequency of the tub 12, the tub 12 may vibrate severely.

In particular, in acceleration section d1 in which the drum 11 is accelerated from the first reference speed to the second reference speed (e.g., about 300 RPM) during the resonance acceleration section SR, the tub 12 may vibrate relatively more severely.

Accordingly, in the resonance acceleration section SR, in case that the damping force of the damper 100 connecting the tub 12 and the cabinet 10 is increased based on the vibration value generated according to the rotation of the drum 11, the vibration of the tub 12 can be effectively reduced.

Similarly, among the sections in which the drum 11 is decelerated after the high speed rotation section SH, the tub 12 may vibrate relatively more severely even in the deceleration section d2 in which the drum 11 is decelerated from the second reference speed to the first reference speed.

Also, vibration of the tub 12 according to the rotation of the drum 11 may occur in the weight sensing section SWS and/or the unbalance sensing section SUB.

On the other hand, vibration of the tub 12 may relatively not occur in sections other than the sections described above (e.g., the pre-spin section SPS).

In case that the damping force of the damper 100 is increased in a section where the tub 12 does not vibrate relatively, as the transmitted force of the vibration generated by the drum 11 increases, the tub 12 may vibrate more severely.

Accordingly, it is necessary to reduce the damping force of the damper 100 in the section where the tub 12 does not relatively vibrate.

The controller 190 may control the duty ratio of the voltage applied to the at least one coil 150 based on the process being performed by the washing machine 1.

Referring to FIG. 13, according to various embodiments, the controller 190 may adjust the duty ratio of the voltage applied to the at least one coil 150 in the weight sensing section SWS (example of 1100) to a pre-set value a1 (1150).

Specifically, the controller 190 may adjust the duty ratio of the voltage applied to the at least one coil 150 to the pre-set value a1 regardless of the vibration value of the tub 12 detected by the vibration sensor 180 in the weight sensing section SWS.

The pre-set value a1 may be pre-set as the most efficient value capable of reducing vibration generated in the weight sensing section SWS. For example, the pre-set value a1 may be set to about 15% to about 25%.

According to various embodiments, the controller 190 may adjust the duty ratio of the voltage applied to the at least one coil 150 to a pre-set value a2 in the unbalance sensing section SUB (example of 1200) (1250).

Specifically, the controller 190 may adjust the duty ratio of the voltage applied to the at least one coil 150 to the pre-set value a2 regardless of the vibration value of the tub 12 detected by the vibration sensor 180 in the unbalance sensing section SUB.

The pre-set value a2 may be pre-set as the most efficient value capable of reducing vibration occurring in the unbalance sensing section SUB. More specifically, the pre-set value a2 may be smaller than the pre-set value a1. For example, the pre-set value a2 may be set to about 5% to 15%.

The vibration of the tub 12 in the weight sensing section SWS and the unbalance sensing section SUB is relatively independent of the amount or type of the laundry. Accordingly, by adjusting the duty ratio to the pre-set value in the weight sensing section SWS and the unbalance sensing section SUB, vibration of the tub 12 can be efficiently reduced without a complicated algorithm.

According to the present disclosure, since the duty ratio of the voltage applied to the at least one coil 150 is adjusted to be different from each other in the weight sensing section SWS and the unbalance sensing section SUB, the vibration of the tub 12 can be effectively reduced.

According to various embodiments, the controller 190 may control the duty ratio of the voltage applied to the at least one coil 150 based on the vibration value of the tub 12 in the acceleration section SR of the drum 11 (example of 1300) (1350).

In the acceleration section SR of the drum 11, the vibrations of various sizes may occur depending on the amount or type of the laundry, and accordingly, an optimal damping force of the damper 100 capable of effectively reducing the vibrations of various sizes is required.

In particular, in the acceleration section d1 in which the drum 11 is accelerated from the first reference speed to the second reference speed during the resonance acceleration section SR in which the drum 11 is accelerated from the first reference speed to the third reference speed, it is required to change the damping force of the damper 100 according to the vibration value of the tub 12 in order to efficiently reduce vibration.

According to various embodiments, the resonance acceleration section SR may be divided into the first section to an n-th section (n is a natural number greater than or equal to 3).

For example, the first section may mean a section in which the drum 11 is accelerated from the first reference speed to a 1-2 reference speed, the second section may mean a section in which the drum 11 is accelerated from the 1-2 reference speed to a 1-3 reference speed, and the third section may mean a section in which the drum 11 is accelerated from the 1-3 reference speed to a 1-4 reference speed.

A m-th section (m is less than n and a natural number greater than or equal to 3) may mean a section in which the drum 11 is accelerated from a 1-m reference speed to the second reference speed, and the n-th section may mean a section in which the drum 11 is accelerated from the second reference speed to the third reference speed.

According to various embodiments, in an acceleration section d1 in which the drum 11 is accelerated from the first reference speed to the second reference speed during the resonance acceleration section SR, the controller 190 may control the duty ratio of the voltage applied to the at least one coil 150 based on the vibration value of the tub 12, and control the duty ratio of the voltage applied to the at least one coil 150 regardless of the vibration value of the tub 12 in the remaining sections except for the acceleration section d1.

In an embodiment, the controller 190 may adjust the duty ratio of the voltage applied to the at least one coil 150 to the first value when the vibration value of the tub 12 is less than the reference value in the acceleration section d1, and adjust the duty ratio of the voltage applied to the at least one coil 150 to the second value greater than the first value when the vibration value of the tub 12 is greater than the reference value.

For example, in the first section, when the vibration value V of the tub 12 is less than the 1-3 reference values V13 and greater than the 1-4 reference values V14, the controller 190 may adjust the duty ratio of the voltage applied to the at least one coil 150 to b14, adjust the duty ratio of the voltage applied to the at least one coil 150 to b13 when the vibration value V of the tub 12 is smaller than the 1-2 reference value V12 and greater than the 1-3 reference value V13, adjust the duty ratio of the voltage applied to the at least one coil 150 to b12 when the vibration value V of the tub 12 is less than the 1-1 reference value V11 and greater than the 1-2 reference value V12, and adjust the duty ratio of the voltage applied to the at least one coil 150 to b11 when the vibration value V of the tub 12 is greater than the 1-1 reference value V11.

In this case, the size of the reference value may be great in the order of the 1-1 reference value V11, the 1-2 reference value V12, the 1-3 reference value V13, and the 1-4 reference value V14.

In addition, the size of the duty ratio may be great in the order of b11, b12, b13, and b14.

For example, b11 may be 45% to 55%, b12 may be 35% to 45%, b13 may be 25% to 35%, and b14 may be 15% to 25%, but the value of the duty ratio is not limited thereto.

Also, the reference ranges of the lookup table are not limited to the above description.

For another example, in the second section, the controller 190 may adjust the duty ratio of the voltage applied to the at least one coil 150 to b24 when the vibration value V of the tub 12 is less than the 2-3 reference value V23 and greater than the 2-4 reference value V24, adjust the duty ratio of the voltage applied to the at least one coil 150 to b23 when the vibration value V of the tub 12 is less than the 2-2 reference value V22 and greater than the 2-3 reference value V23, adjust the duty ratio of the voltage applied to the at least one coil 150 to b22 when the vibration value V of the tub 12 is less than the 2-1 reference value V21 and greater than the 2-2 reference value V22, and adjust the duty ratio of the voltage applied to the at least one coil 150 to b21 when the vibration value V of the tub 12 is greater than the 2-1 reference value V21.

In this case, the size of the reference value may be great in the order of the 2-1 reference value V21, the 2-2 reference value V22, the 2-3 reference value V23, and the 2-4 reference value V24.

In addition, the size of the duty ratio may be great in the order of b21, b22, b23, and b24.

In addition, in the third section, the controller 190 may adjust the duty ratio of the voltage applied to the at least one coil 150 based on the vibration value of the tub 12 to the 3-1 value to the 3-i value (i is natural number).

According to various embodiments, the reference values V11, V12, V13, and V14 in the first section may be the same as the reference values V21, V22, V23, and V24 in the second section.

According to the present disclosure, the damper 100 may be controlled to have an optimal damping force by applying the same criterion to sections in which vibration characteristics of the tub 12 are similar among the acceleration sections.

According to various embodiments, the reference values V11, V12, V13, and V14 in the first section may be different from the reference values V21, V22, V23, and V24 in the second section.

According to the present disclosure, the damper 100 may be controlled to have an optimal damping force by applying different criteria to sections in which the vibration characteristics of the tub 12 are different among the acceleration sections.

Similarly, the duty ratio values b11, b12, b13, and b14 in the first section may be different from or equal to the duty ratio values b21, b22, b23, and b24 in the second section.

That is, the first lookup table applied in the first section and the second lookup table applied in the second section may be different from each other.

According to various embodiments, the controller 190 may adjust the duty ratio of the voltage applied to the at least one coil 150 based on the first lookup table and the vibration value of the tub 12 in the first section, and adjust the duty cycle of the voltage applied to the at least one coil 150 based on the vibration value of the tub 12 and the second look-up table different from the first look-up table in the second section.

In this case, the first lookup table and the second lookup table may include pre-set values of the duty ratios corresponding to the vibration values of the tub 12 in each section of the washing cycle.

According to various embodiments, the controller 190 may adjust the duty ratio of the voltage applied to the at least one coil 150 to pre-set value a3 in the deceleration section d2 of the drum 11 (example of 1400).

Specifically, the controller 190 may adjust the duty ratio of the voltage applied to the at least one coil 150 to pre-set value a3 regardless of the vibration value of the tub 12 detected by the vibration sensor 180 in the deceleration section d2.

The deceleration section d2 may mean a section in which the drum 11 is decelerated from the second reference speed to the first reference speed. In the section where the drum 11 is decelerated from the second reference speed to the first reference speed, in case that the frequency of the vibration generated by the low speed rotation of the drum 11 coincides with the resonant frequency of the tub 12, the tub 12 may vibrate severely.

However, since the deceleration section d2 is a section in which the drum 11 decelerates after the laundry has already been spin-dried, the vibration in the deceleration section d2 is not vibration generated by unbalanced laundry but vibration generated from the tub 12 itself.

That is, the vibration of the tub 12 in the deceleration section d2 is relatively independent of the amount or type of laundry. Accordingly, in the deceleration section d2, the vibration of the tub 12 can be efficiently reduced without a complicated algorithm by adjusting the duty ratio to the pre-set value.

The pre-set value a3 may be preset as the most efficient value capable of reducing vibration occurring in the deceleration section d2. For example, the pre-set value a3 may be set to about 45% to about 55%.

The controller 190 may not apply current to the at least one coil 150 in the remaining sections (no of 1100, no of 1200, no of 1300, and no of 1400) that do not correspond to the weight sensing section SWS, the unbalance sensing section SUB, the acceleration section d1, and the deceleration section d2 of the washing cycle (1500).

That is, the controller 190 may set the duty ratio of the voltage applied to the at least one coil 150 to 0% in the remaining sections that do not correspond to the weight sensing section SWS, the unbalance sensing section SUB, the acceleration section d1, and the deceleration section d2 of the washing cycle.

Accordingly, by minimizing the damping force of the damper 100 in the remaining sections, due to the increase in transmission force of the vibration generated in the drum 11, it is possible to prevent the tub 12 from vibrating more severely.

The controller 190 may unlock the door locking device based on the completion of the washing cycle (1600) and notify the user that the washing cycle has ended through a user interface.

According to the present disclosure, in an acceleration section in which the optimum damping force of the damper 100 according to the vibration value of the tub 12 is required, by controlling the duty ratio of the voltage applied to the at least one coil 150 included in the damper 100 based on the vibration value of the tub 12, noise caused by vibration of the tub 12 can be effectively prevented.

In addition, according to the present disclosure, in a section in which a specific damping force of the damper 100 is required regardless of the vibration value of the tub 12, by adjusting the duty ratio of the voltage applied to the at least one coil 150 to pre-set value, noise generated by vibration of the tub 12 can be effectively prevented.

In addition, according to the present disclosure, in a section in which the transmission force of vibration between the drum 11 and the tub 12 needs to be reduced, noise caused by vibration of the tub 12 can be effectively prevented by minimizing the damping force of the damper 100.

Figure 14:
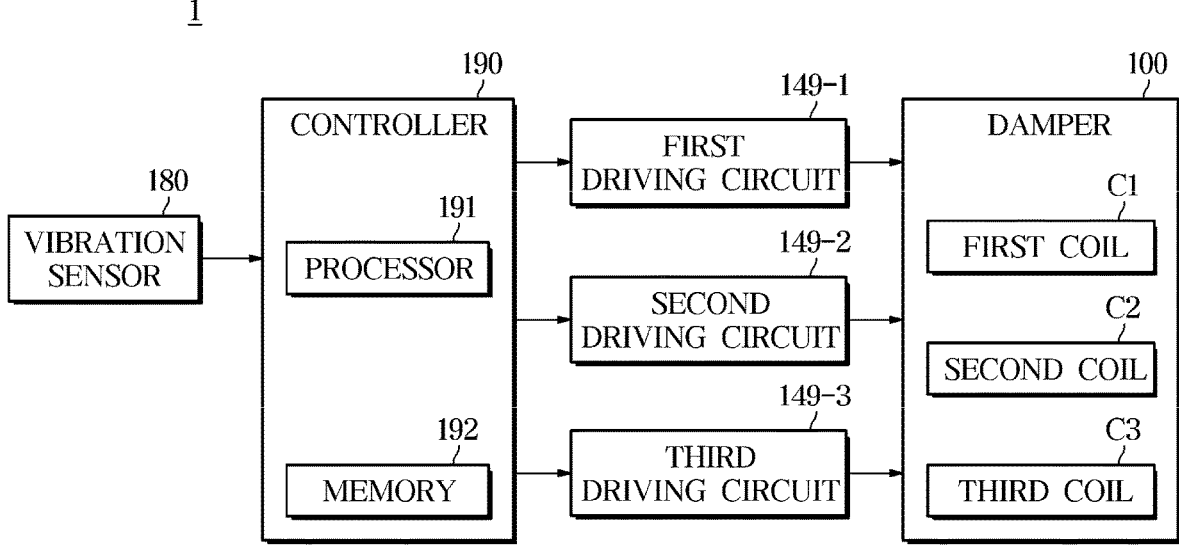
FIG. 14 is a block diagram illustrating the configuration of a washing machine according to another exemplary embodiment of the disclosure.

FIG. 14 is a block diagram showing the configuration of a washing machine according to another embodiment of the present disclosure.

Referring to FIG. 14, the damper 100 according to an embodiment may include a plurality of coils (e.g., a first coil C1, a second coil C2, and/or a third coil C3).

According to various embodiments, voltages may be applied to each of the plurality of coils C1, C2, and C3 from different driving circuits 149-1, 149-2, and 149-3.

For example, the first coil C1 may generate magnetic field when voltage is applied from the first driving circuit 149-1, and the second coil C2 may generate magnetic field when voltage is applied from the second driving circuit 149-2.

In addition, the third coil C3 may generate magnetic field when voltage is applied from the third driving circuit 149-3.

The first driving circuit 149-1 may include the first power supply unit that supplies a pre-set voltage (for example, 6V), and at least one switch that cuts off power supplied from the first power supply unit or supplies power supplied from the first power supply unit to the first coil C1.

The second driving circuit 149-2 may include the second power supply unit that supplies a pre-set voltage (for example, 12V), and at least one switch that cuts off power supplied from the second power supply unit or supplies power supplied from the second power supply unit to the second coil C2.

The third driving circuit 149-3 may include the third power supply unit that supplies a pre-set voltage (for example, 24V), and at least one switch that cuts off power supplied from the third power supply unit or supplies power supplied from the third power supply unit to the third coil C3.

In this case, the pre-set first voltage supplied by the first power supply unit, the pre-set second voltage supplied by the second power supply unit, and the pre-set third voltage supplied by the third power supply unit may have different sizes or the same size.

The controller 190 may control the first driving circuit 149-1 to supply the first voltage to the first coil C1, control the second driving circuit 149-2 to supply the second voltage to the second coil C2, and control the third drive circuit 149-3 to supply the third voltage to the third coil C3.

In this case, the controller 190 may independently control the first driving circuit 149-1, the second driving circuit 149-2, and the third driving circuit 149-3.

For example, the controller 190 may control the first driving circuit 149- to apply the first voltage only to the first coil C1 among the first coil C1, the second coil C2, and the third coil C3, control the second driving circuit 149-2 to apply the second voltage only to the second coil C2 among the first coil C1, the second coil C2, and the third coil C3, and control the third driving circuit 149-3 to apply the third voltage only to the third coil C3 among the first coil C1, the second coil C2, and the third coil C3.

In addition, the controller 190 may control the first driving circuit 149-1 and the second driving circuit 149-2 to apply the first voltage and the second voltage only to the first coil C1 and the second coil C2 among the first coil C1, the second coil C2, and the third coil C3, control the first driving circuit 149-1 and the third driving circuit 149-3 to apply the first voltage and the third voltage only to the coil C1 and the third coil C3 among the first coil C1, the second coil C2, and the third coil C3, and control the second driving circuit 149-2 and the third driving circuit 149-3 to apply the second voltage and the third voltage only to the second coil C2 and the third coil C3 among the first coil C1, the second coil C2, and the third coil C3.

In addition, the controller 190 may control the first driving circuit 149-1, the second driving circuit 149-2, and the third driving circuit 149-3 so that the first voltage, the second voltage, and the third voltage are applied to all of the first coil C1, the second coil C2, and the third coil C3.

FIG. 15 illustrates another example of a lookup table for controlling damping force of a damper based on a vibration value of a tub.

Referring to FIG. 15, the controller 190 may selectively apply the first voltage, the second voltage, and the third voltage to each of the first coil C1, the second coil C2, and the third coil C3 based on the vibration value of the tub 12.

In FIGS. 14 and 15, for convenience of explanation, it is assumed that one damper includes three coils, but the number of coils may be two or more than three.

The controller 190 may operate only the first coil C1 based on the case that the vibration value K of the tub 12 is less than the first reference value K1 in the acceleration section d1.

Specifically, the controller 190 may operate the first driving circuit 149-1 to apply the first voltage to the first coil C1 when the vibration value K of the tub 12 is less than first reference value K1.

Conversely, the controller 190 may operate only the second coil C2 based on the case that the vibration value K of the tub 12 is greater than the first reference value K1 and less than the second reference value K2.

Specifically, the controller 190 may control the second driving circuit 149-2 to apply the second voltage to the second coil C2 based on the case that the vibration value K of the tub 12 is greater than the first reference value K1 and less than the second reference value K2.

In this case, the magnitudes of the first voltage and the second voltage may be different from each other, and the magnitude of the second voltage (e.g., about 12V) may be greater than the magnitude of the first voltage (e.g., about 6V).

Similarly, the controller 190 may control the third driving circuit 149-3 to apply the third voltage to the third coil C3 based on the case that the vibration value K of the tub 12 is greater than the second reference value K2 and less than the third reference value K3.

In this case, the magnitudes of the second voltage and the third voltage may be different from each other, and the magnitude of the third voltage (e.g., about 24V) may be greater than the magnitude of the second voltage (e.g., about 12V).

Similarly, the controller 190 may apply current only to the first coil C1 and the second coil C2, only to the first coil C1 and the third coil C3, only to the second coil C2 and the third coil C3, or to all of the first coil C1, the second coil C2, and the third coil C3 based on the vibration value of the tub 12.

For example, the controller 190 may apply the first voltage to the first coil C1 when the vibration value of the tub 12 falls within the first reference range (e.g., K1>K), apply the second voltage to the second coil C2 when the vibration value falls within the second reference range (e.g., K2>K>K1), and apply the first voltage and the second voltage to the first coil C1 and the second coil C2, respectively, when the vibration value of the tub 12 falls within the third reference range (e.g., K3>K>K2).

In this case, the vibration value corresponding to the first reference range may be less than the vibration value corresponding to the second reference range, and the vibration value corresponding to the second reference range may be less than the vibration value corresponding to the third reference range.

As described above, the controller 190 may flexibly adjust the damping force of the damper 100 by selectively applying the voltage to the first coil C1, the second coil C2, and/or the third coil C3 based on the vibration value of the tub 12.

According to the present disclosure, instead of controlling the duty ratio of the voltage applied to the coil 150, the damping force of the damper 100 may be gradually adjusted by selectively applying voltages having different or the same magnitude to each coil 150.

Figure 16:
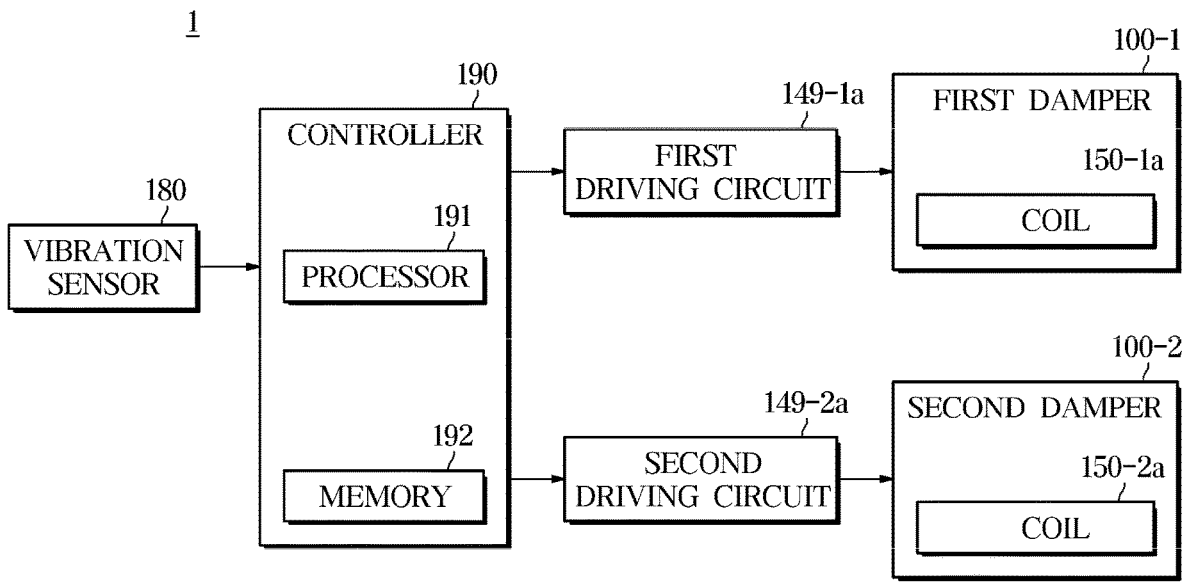
FIG. 16 is a block diagram illustrating the configuration of a washing machine according to another exemplary embodiment of the disclosure.

FIG. 16 is a block diagram showing the configuration of a washing machine according to another embodiment of the present disclosure.

Referring to FIG. 16, the at least one damper 100 may include the first damper 100-1 and the second damper 100-2 (see FIG. 2).

In this case, the first damper 100-1 may mean a damper coupled to the front side of the cabinet 10 and the tub 12 among the plurality of dampers 100, and the second damper 100-2 may mean a damper coupled to the rear side of the cabinet 10 and the tub 12 among the plurality of dampers 100.

The first damper 100-1 and the second damper 100-2 may each include coils 150-1a and 150-2a that generate magnetic fields based on current applied thereto.

The coil 150-1a of the first damper 100-1 may receive voltage from the first driving circuit 149-1a, and the coil 150-2a of the second damper 100-2 may receive voltage from the second driving circuit 149-2a.

The controller 190 may independently control the first driving circuit 149-1a and the second driving circuit 149-2a, and independently adjust the damping force of the first damper 100-1 and the damping force of the second damper 100-2.

Even if the vibration value of the tub 12 is the same, in order to maximally reduce the vibration of the tub 12, it is necessary to flexibly control the damping force of the damper 100 according to the coupling position of the damper 100.

For example, greater vibration may occur in the rear than in the front of the tub 12 in the first section of the acceleration section, and greater vibration may occur in the front than in the rear of the tub 12 in the second section of the acceleration section.

FIG. 17 shows another example of a lookup table for controlling the damping force of a damper 100 based on the vibration value of a tub.

Referring to FIG. 17, the controller 190 may differently control the damping force of the first damper 100-1 and the damping force of the second damper 100-2 in some sections of the acceleration section.

To this end, the controller 190 may adjust the duty ratio of the voltage applied to the coil 150-1a of the first damper 100-1 based on the first lookup table and the vibration value of the tub 12, and adjust the duty ratio of the voltage applied to the coil 150-2a of the second damper 100-2 based on the second lookup table different from the first lookup table and the vibration value of the tub 12.

As described in FIG. 13, the controller 190 may control the voltage applied to the coil 150-1a of the first damper 100-1 and the coil 150-2a of the second damper based on the vibration value of the tub 12 in the first to m-th sections, but the duty ratio of the voltage applied to the coil 150-1a of the first damper 100-1 and the coil 150-2a of the second damper 100-2 may be different from each other even if the vibration value of the tub 12 is the same in the same section.

For example, in the first section, the controller 190 may adjust the duty ratio of the voltage applied to the coil 150-1a of the first damper 100 to the b14 when the vibration value V of the tub 12 is less than the 1-3 reference values V13 and greater than the 1-4 reference values V14, and adjust the duty ratio of the voltage applied to the coil 150-1a of the first damper 100 to the b13 when the vibration value V of the tub 12 is less than the 1-2 reference value V12 and greater than the 1-3 reference value V13. In addition, the controller 190 may control the duty ratio of the voltage applied to the coil 150 of the first damper 100-1 to b12 when the vibration value V of the tub 12 is less than the 1-1 reference value V11 and greater than the 1-2 reference value V12, and adjust the duty ratio of the voltage applied to the coil 150 of the first damper 100-1 to b11 when the vibration value V of the tub 12 is greater than the 1-1 reference value V11.

On the other hand, in the first section, the controller 190 may adjust the duty ratio of the voltage applied to the coil 150-2a of the second damper 100-2 to the e14 when the vibration value V of the tub 12 is less than the 1-3 reference values V13 and greater than the 1-4 reference values V14, and adjust the duty ratio of the voltage applied to the coil 150-2a of the second damper 100-2 to the e13 when the vibration value V of the tub 12 is less than the 1-2 reference values V12 and greater than the 1-3 reference values V13. In addition, the controller 190 may adjust the duty ratio of the voltage applied to the coil 150-2a of the second damper 100-2 to the e12 when the vibration value V of the tub 12 is less than the 1-1 reference values V11 and greater than the 1-2 reference values V12, and adjust the duty ratio of the voltage applied to the coil 150-2a of the second damper

100-2 to the e11 when the vibration value V of the tub 12 is greater than the 1-1 reference values V11.

In this case, at least one of b11 to b14 may be different from a value belonging to the same reference range among e11 to e14.

Similarly, when the duty ratio of the voltage applied to the coil 150-1a of the first damper 100-1 is set to b21, b22, b23, b24, b31, b32, b33, and b34, the duty ratio of the voltage applied to the coil 150-2a of the second damper 100-2 may be set to e21, e22, e23, e24, e31, e32, e33, and e34.

For example, in the first section in which greater vibration occurs at the rear than at the front of the tub 12, each of b11 to b14 may be less than or equal to each of e11 to e14, and in the second section in which greater vibration occurs at the front than at the rear of the tub 12, each of b21 to b24 may be greater than or equal to each of e21 to e24.

According to the present disclosure, the vibration of the tub 12 can be optimally reduced by adjusting the damping force to be different from each other according to the coupling position of each of the plurality of dampers 100.

On the other hand, in the remaining sections except for the acceleration section of the drum 11, the duty ratio of the voltage applied to the coil 150-1a of the first damper 100-1 and the coil 150-2a of the second damper 100-2 may be matched.

According to the present disclosure, the vibration of the tub 12 can be efficiently reduced without a complicated algorithm.

Hereinafter, for convenience of description, the first damper 100-1 is defined as a front damper and the second damper 100-2 is defined as a rear damper.

Figure 18:
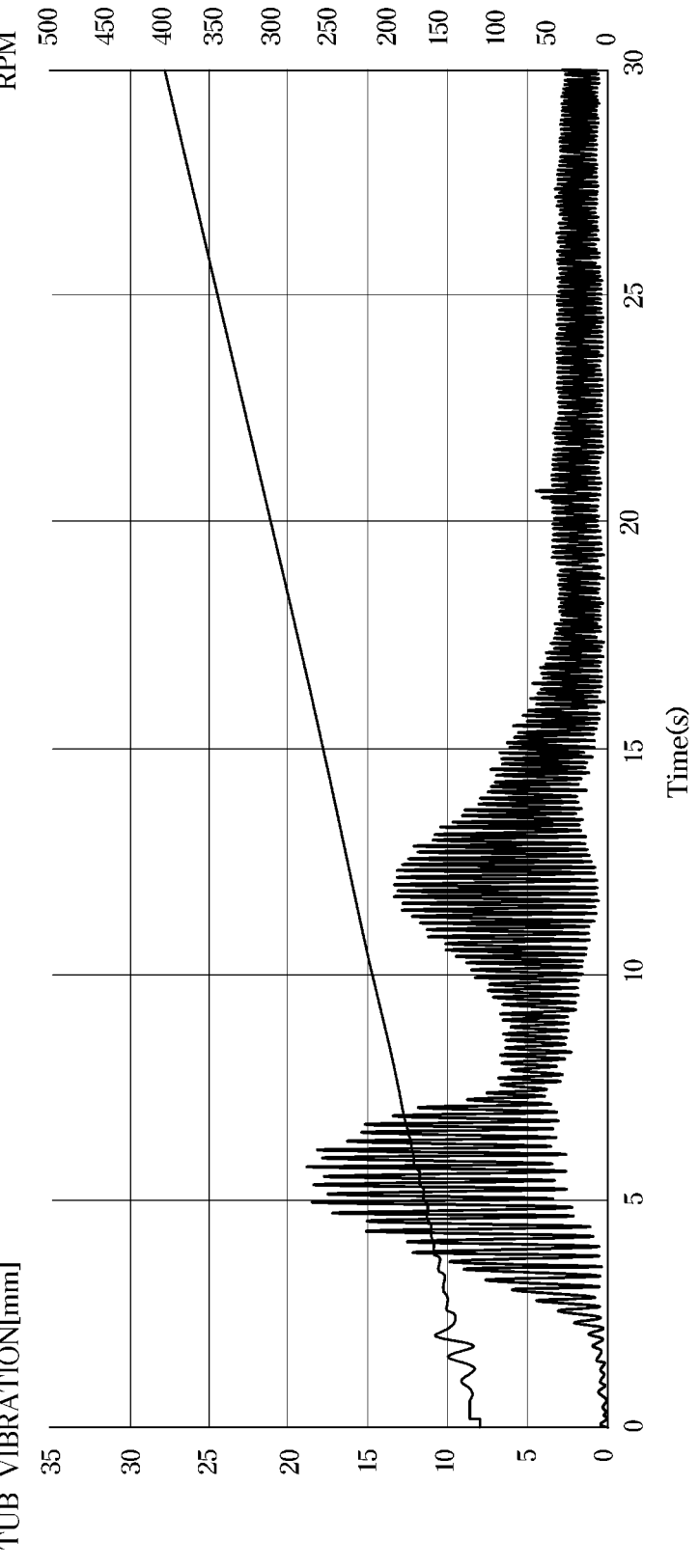
FIG. 18 shows an example of an amount of vibration generated at the front side of a tub according to an exemplary embodiment of the disclosure.
Figure 19:
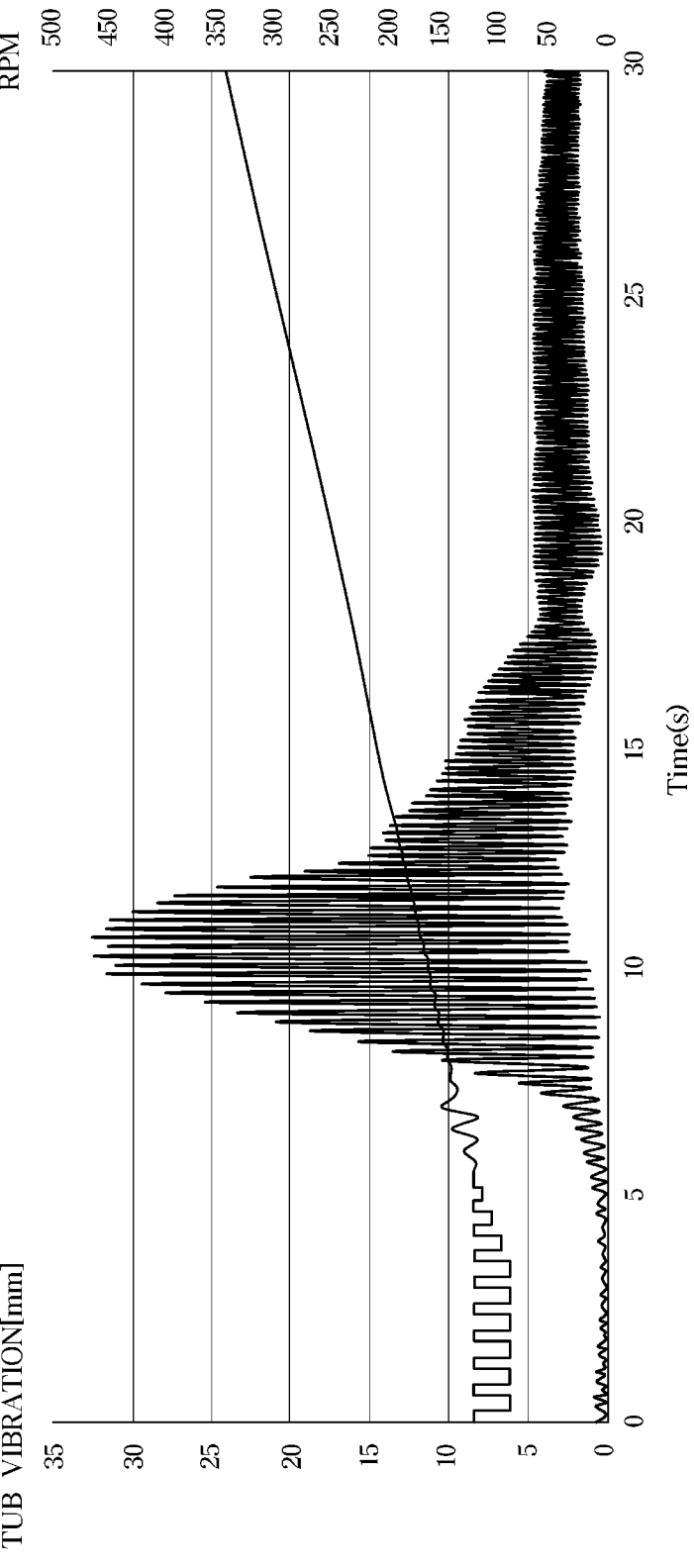
FIG. 19 shows an example of an amount of vibration generated at the rear side of a tub according to an exemplary embodiment of the disclosure.

FIG. 18 shows an example of the amount of vibration generated from the front side of a tub, and FIG. 19 shows an example of the amount of vibration generated from the rear side of a tub.

The vibration mode of the tub 12 in the resonance acceleration period SR of the drum 11 may be defined as three major modes (e.g., lateral mode, yawing mode, and pitching mode).

The lateral mode refers to a mode in which the tub 12 moves in translation from side to side, the yawing mode refers to a mode in which the front side of the tub 12 rotates to the left and right, and the pitching mode refers to a mode in which the front side of the tub 12 rotates vertically.

The vibration mode of the tub 12 is changed according to the rotation speed of the drum 11. The vibration mode is mainly a lateral mode when the rotation speed of the drum 11 is about 150 RPM, is mainly changed to the yawing mode when the rotation speed of the drum 11 is about 220 RPM, and is changed to the pitching mode when the rotation speed of the drum 11 is about 250 RPM.

Referring to FIGS. 18 and 19, the profile of vibration generated from the front side of the tub 12 and the profile of vibration generated from the rear side of the tub 12 may be confirmed.

In a section in which the drum 11 is accelerated from the first speed (e.g., about 120 RPM) to the second speed (e.g., about 200 RPM), the vibration mode of the tub 12 may correspond to the lateral mode, and accordingly, the vibration value generated from the rear side of the tub 12 may be greater than the vibration value generated from the front side of the tub 12.

More specifically, when the rotation speed of the drum 11 corresponds to about 160 RPM, difference between the vibration value (about 32.6 mm) generated from the rear side of the tub 12 and the vibration value (about 18.4 mm) generated from the front side of the tub 12 is large.

On the other hand, in a section in which the drum 11 is accelerated from the second speed (e.g., about 200 RPM) to the third speed (e.g., about 260 RPM), the vibration mode of the tub 12 may correspond to the yawing mode or the pitching mode, Accordingly, the vibration value generated from the front side of the tub 12 may be greater than the vibration value generated from the rear side of the tub 12.

More specifically, when the rotation speed of the drum 11 corresponds to about 220 RPM, difference between the vibration value 12 (approximately 5 mm) generated from the rear side of the tub and the vibration value (approximately 13.2 mm) generated from the front side of the tub 12 is large.

Since the magnitudes of the vibration values generated from the front side of the tub 12 and the vibration values generated from the rear side of the tub 12 are different depending on the vibration mode of the tub 12, in the resonance acceleration section SR, in case that the damping force of the front damper 100-1 and the damping force of the rear damper 100-2 are adjusted differently from each other, the vibration value generated in the tub 12 can be effectively damped.

Figure 20:
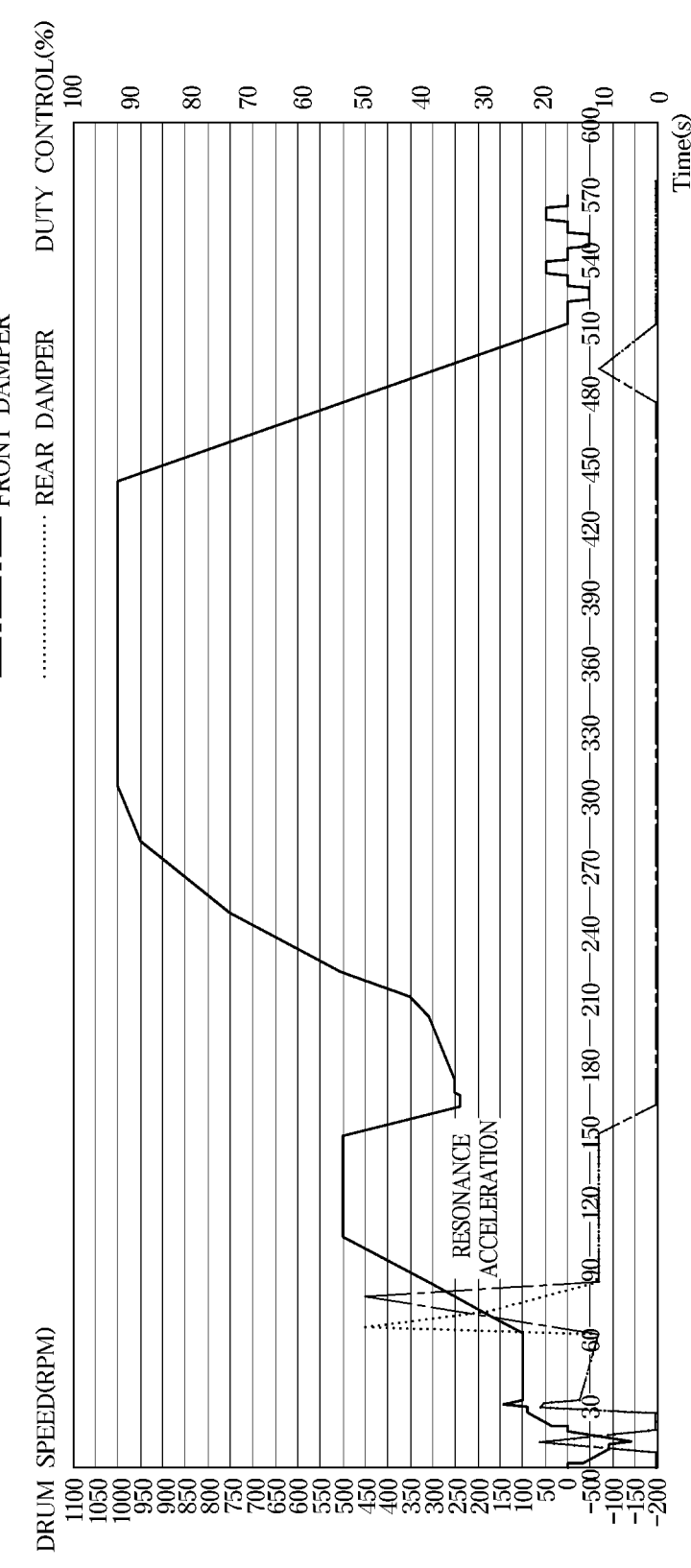
FIG. 20 illustrates an example of duty ratio of voltage applied to a front damper and a rear damper according to an exemplary embodiment of the disclosure.

FIG. 20 illustrates an example of a duty ratio of a voltage applied to a front damper and a rear damper according to an embodiment.

Hereinafter, for convenience of description, it is assumed that the coil included in the front damper 100-1 is the first coil and the coil included in the rear damper 100-2 is the second coil. Each of the first coil and the second coil may include at least one coil.

Referring to FIG. 20, the controller 190 may control the voltage applied to the first coil and the second coil to allow the damping force of the rear damper 100-2 to be greater than the damping force of the front damper 100-1 in the first section in which the drum 11 is accelerated from the first speed (e.g., 120 RPM) to the second speed (e.g., 200 RPM).

For example, the controller 190 may set the duty ratio of the voltage applied to the second coil to be greater than the duty ratio of the voltage applied to the first coil in the first section in which the drum 11 is accelerated from the first speed (e.g., 120 RPM) to the second speed (e.g., 200 RPM).

As another example, the controller 190 may adjust the magnitude of the total voltage applied to the plurality of second coils to be greater than the magnitude of the total voltage applied to the plurality of first coils in the first section in which the drum 11 is accelerated from the first speed (e.g., 120 RPM) to the second speed (e.g., 200 RPM).

In this case, the first section may include a time when the rotation speed of the drum 11 is 160 RPM. That is, in the first section, the rotation speed of the drum 11 may reach 160 RPM.

According to the present disclosure, when the magnitude of vibration generated from the rear side of the tub 12 is greater than the magnitude of vibration generated from the front side of the tub 12, vibration of the tub 12 can be minimized by optimally controlling the frictional force of the rear damper 100-2 disposed close to the rear side of the tub 12.

On the other hand, the controller 190 may control the voltage applied to the first coil and the second coil to allow the damping force of the front damper 100-1 to be greater than the damping force of the rear damper 100-2 in the second section in which the drum 11 is accelerated from the second speed (e.g., 200 RPM) to the third speed (e.g., 260 RPM).

For example, the controller 190 may set the duty ratio of the voltage applied to the first coil to be greater than the duty ratio of the voltage applied to the second coil in the second section in which the drum 11 is accelerated from the second speed (e.g., 200 RPM) to the third speed (e.g., 260 RPM).

As another example, the controller 190 may adjust the magnitude of the total voltage applied to the plurality of first coils to be greater than the total voltage applied to the plurality of second coils in the second section in which the drum 11 is accelerated from the second speed (e.g., 200 RPM) to the third speed (e.g., 260 RPM).

In this case, the second section may include a time when the rotation speed of the drum 11 is 230 RPM. That is, in the second section, the rotation speed of the drum 11 may reach 230 RPM.

However, the example of the first section and the example of the second section are not limited to the above examples, all sections in which the magnitude of vibration generated from the rear side of the tub 12 is greater than the magnitude of vibration generated from the front side of the tub 12 may be included in the first section, and all sections in which the magnitude of vibration generated from the front side of the tub 12 is greater than the magnitude of vibration generated from the rear side of the tub 12 may be included in the second section.

According to the present disclosure, when the magnitude of vibration generated from the front side of the tub 12 is greater than the magnitude of vibration generated from the rear side of the tub 12, vibration of the tub 12 can be minimized by optimally controlling the frictional force of the front damper 100-1 disposed close to the front side of the tub 12.

According to the present disclosure, the damping force of the front damper 100-1 and the rear damper 100-2 may be differently controlled by the vibration mode of the tub 12 according to the rotation speed of the drum 11.

As described above, when the vibration sensor 180 corresponds to the 6-axis sensor, the controller 190 may determine a vibration value (hereinafter referred to as 'first vibration value') generated from the front of the tub 12 and a vibration value (hereinafter referred to as 'second vibration value') generated from the rear of the tub 12 based on the vibration value of the tub 12 obtained from the vibration sensor 180.

According to various embodiments, the controller 190 may independently control the damping force of the front damper 100-1 and the damping force of the rear damper 100-2 based on the first vibration value and the second vibration value.

For example, the controller 190 may control the voltage applied to the first coil included in the front damper 100-1 based on the first vibration value, and control the voltage applied to the second coil included in the rear damper 100-2 based on the second vibration value.

According to various embodiments, the controller 190 may control the duty ratio of the voltage applied to the first coil referring to the lookup table shown in FIG. 13 based on the rotation speed of the drum 11 and the first vibration value.

In addition, the controller 190 may control the duty ratio of the voltage applied to the second coil referring to the lookup table shown in FIG. 13 based on the rotation speed of the drum 11 and the second vibration value.

According to various embodiments, the controller 190 may selectively supply power to the plurality of first coils referring to the lookup table shown in FIG. 15 based on the rotation speed and the first vibration value of the drum 11.

In addition, the controller 190 may selectively supply power to the plurality of second coils referring to the lookup table shown in FIG. 15 based on the rotation speed of the drum 11 and the second vibration value.

In an embodiment, when the first vibration value is greater than the second vibration value, the controller 190 may control the voltage applied to the first coil and the second coil so that the damping force of the front damper 100-1 is greater than the damping force of the rear damper 100-2, and control the voltage applied to the first coil and the second coil so that the damping force of the rear damper 100-2 is greater than the damping force of the front damper 100-1 when the second vibration value is greater than the first vibration value.

For example, when the first vibration value is greater than the second vibration value, the controller 190 may adjust the duty ratio of the voltage applied to the first coil to be greater than the duty ratio of the voltage applied to the second coil, and adjust the duty ratio of the voltage applied to the second coil to be greater than the duty ratio of the voltage applied to the first coil when the second vibration value is greater than the first vibration value.

As another example, when the first vibration value is greater than the second vibration value, the controller 190 may adjust the total voltage applied to the plurality of first coils to be greater than the total voltage applied to the plurality of second coils, and adjust the total voltage applied to the plurality of second coils to be greater than the total voltage applied to the plurality of first coils when the second vibration value is greater than the first vibration value.

According to the present disclosure, vibration generated from the front and rear side of the tub 12 is identified, and the vibration of the tub 12 can be effectively reduced.

According to an embodiment of the disclosure, the damper may include a piston, a cylinder formed with an inner space such that the piston is movable therein and having a yoke and a bobbin positioned at one side of the yoke, the magneto-rheological fluid may be accommodated between the outer surface of the piston and the inner surface of the cylinder, at least one coil may be wound around the bobbin, and thickness of the magneto-rheological fluid disposed between the piston and the bobbin may be thinner than thickness of the magneto-rheological fluid disposed between the piston and the yoke.

According to one aspect of the disclosure, it is possible to provide an electromagnetic damper with excellent damping performance compared to the amount of magneto-rheological fluid used. According to another aspect of the disclosure, the damping force of an electromagnetic damper can be efficiently controlled based on the ongoing process and the vibration value of the tub. According to another aspect of the disclosure, the washing machine in which the vibration of the tub is reduced can be provided. According to another aspect of the disclosure, the damping force of an electromagnetic damper is controlled based on the amount of vibration of the tub in a transient section in which large vibration occurs in the tub, and the damping force of the electromagnetic damper is weakly controlled in a normal section in which relatively small vibration occurs in the tub. Thereby, noise generated by the washing machine can be minimized. According to another aspect of the disclosure, the damping force of the electromagnetic damper can be controlled in stages.

Meanwhile, the disclosed embodiments may be applied to the spin-dry process, the washing process, and the rinsing process.

Meanwhile, the disclosed embodiments may be implemented in the form of a recording medium storing instructions executable by a computer. The instructions may be stored in the form of program codes, and when executed by a processor, the instructions may create program modules to perform operations of the disclosed embodiments. The recording medium may be implemented as a computer-readable recording medium.

The computer-readable recording media include all types of recording media in which instructions decoded by a computer are stored. For example, there may be read only memory (ROM), random access memory (RAM), a magnetic tape, a magnetic disk, a flash memory, an optical data storage device, and the like.

Also, the computer-readable recording medium may be provided in the form of a non-transitory storage medium. The 'Non-temporary storage medium' only means that it is a tangible device and does not contain a signal (e.g., electromagnetic wave). This term does not distinguish between a case in which data is semi-permanently stored in a storage medium and a case in which data is temporarily stored. For example, the 'non-temporary storage medium' may include a buffer in which data is temporarily stored.

According to an embodiment, the method according to various embodiments disclosed in this document may be provided by being included in a computer program product. The computer program product may be traded between sellers and buyers as commodities. The computer program product may be distributed in the form of a machine-readable recording medium (e.g., compact disc read only memory), or be distributed by online (e.g., download or upload) using an application store (e.g., Play Store™) or two user devices (e.g., smartphones), directly. In the case of online distribution, at least a part of the computer program product (e.g., a downloadable app) may be at least temporarily stored on a device-readable recording medium such as a manufacturer's server, an application store server, or a relay server's memory, or may be created temporarily.

As above, the disclosed embodiments have been described with reference to the accompanying drawings. Those skilled in the art to which the present disclosure pertains will understand that the present disclosure can be implemented in a form different from the disclosed embodiments without changing the technical spirit or essential features of the present disclosure. The disclosed embodiments are illustrative and should not be construed as limiting.

What is claimed is:

1. A washing machine comprising:
   a cabinet;
   a tub disposed in the cabinet;
   a drum arranged inside the tub so as to be rotatable;
   at least one damper coupled to the cabinet and the tub, and including:
      at least one coil configured to generate a magnetic field based on a voltage applied to the at least one coil, and
      a magneto-rheological fluid having a viscosity that changes based on the magnetic field; and
   a controller configured to control the voltage applied to the at least one coil based on a rotation speed of the drum and a vibration value of the tub so as to generate the magnetic field to change the viscosity of the magneto-rheological fluid to reduce the vibration of the tub caused by the rotation of the drum.

2. The washing machine of claim 1, wherein the controller is configured to
   adjust a duty ratio of the voltage applied to the at least one coil to a first value based on the vibration value of the tub being less than a reference value, and adjust the duty ratio of the voltage applied to the at least one coil to a second value which is greater than the first value based on the vibration value of the tub being greater than the reference value.

3. The washing machine of claim 1, wherein the controller is configured to adjust a duty ratio of the voltage applied to the at least one coil based on a first lookup table in a first section of a washing machine process in which the drum is accelerated from a first speed to a second speed, and adjust the duty ratio of the voltage applied to the at least one coil based on a second lookup table that is different from the first lookup table in a second section of the washing machine process in which the drum is accelerated from the second speed to a third speed.

4. The washing machine of claim 1, wherein the at least one coil includes:

a first coil configured to receive a first voltage from a first power source, and a second coil configured to receive a second voltage from a second power source, and the controller is configured to selectively apply the first voltage and the second voltage to the first coil and the second coil, respectively, based on the rotation speed of the drum and the vibration value of the tub.

5. The washing machine of claim 4, wherein the controller is configured to apply the first voltage to the first coil based on the vibration value of the tub falling within a first reference range, apply the second voltage to the second coil based on the vibration value of the tub falling within a second reference range, and apply the first voltage and the second voltage to the first coil and the second coil, respectively, based on the vibration value of the tub falling within a third reference range.

6. The washing machine of claim 1, wherein the at least one damper includes:

at least one front damper with a first coil and disposed close to a front side of the tub, and at least one rear damper with a second coil and disposed close to a rear side of the tub, and the controller is configured to control the voltage applied to the first coil and the second coil so that a damping force of the at least one rear damper is greater than a damping force of the at least one front damper in a first section of a washing machine process in which the drum is accelerated from a first speed to a second speed, and control the voltage applied to the first coil and the second coil so that the damping force of the at least one front damper is greater than the damping force of the at least one rear damper in a second section of the washing machine process in which the drum is accelerated from the second speed to a third speed.

7. The washing machine of claim 6, wherein 160 RPM is in between the first speed and the second speed, and 230 RPM is in between the second speed and the third speed.

8. The washing machine of claim 1, further comprising: a vibration sensor configured to detect the vibration value of the tub, wherein the at least one damper includes:

at least one front damper with a first coil and disposed close to a front side of the tub, and at least one rear damper with a second coil and disposed close to a rear side of the tub, and the controller is configured to determine a first vibration value generated at the front side of the tub and a second vibration value generated at the rear side of the tub based on the vibration value of the tub detected by the vibration sensor, control the voltage applied to the first coil based on the first vibration value, and control the voltage applied to the second coil based on the second vibration value.

9. The washing machine of claim 8, wherein the controller is configured to control the voltage applied to the first coil and the second coil so that a damping force of the front damper is greater than a damping force of the rear damper based on the first vibration value being greater than the second vibration value, and the controller is configured to control the voltage applied to the first coil and the second coil so that the damping force of the rear damper is greater than the damping force of the front damper based on the second vibration value being greater than the first vibration value.

10. The washing machine of claim 9, wherein the controller is configured to adjust a duty ratio of the voltage applied to the first coil to be higher than a duty ratio of the voltage applied to the second coil such that the damping force of the front damper is greater than the damping force of the rear damper, and adjust the duty ratio of the voltage applied to the second coil to be higher than the duty ratio of the voltage applied to the first coil such that the damping force of the rear damper is greater than the damping force of the front damper.

11. A method of controlling a washing machine including at least one damper, including at least one coil configured to generate a magnetic field based on a voltage applied to the at least one coil and a magneto-rheological fluid having a viscosity that changes depending on the magnetic field, the at least one damper coupled to a cabinet and a tub, the method comprising:

controlling the voltage applied to the at least one coil based on a rotation speed of the drum and a vibration value of the tub so as to generate the magnetic field to change the viscosity of the magneto-rheological fluid to reduce the vibration of the tub caused by the rotation of the drum.

12. The method of claim 11, wherein the controlling the voltage applied to the at least one coil includes:

adjusting a duty ratio of the voltage applied to the at least one coil to a first value based on the vibration value of the tub being less than a reference value, and adjusting the duty ratio of the voltage applied to the at least one coil to a second value which is greater than the first value based on the vibration value of the tub being greater than the reference value.

13. The method of claim 11, wherein the controlling the voltage applied to the at least one coil includes:

adjusting a duty ratio of the voltage applied to the at least one coil based on a first lookup table in a first section of a washing machine process in which the drum is accelerated from a first speed to a second speed, and adjusting the duty ratio of the voltage applied to the at least one coil based on a second lookup table that is different from the first lookup table in a second section of the washing machine process in which the drum is accelerated from the second speed to a third speed.

14. The method of claim 11, wherein
the at least one coil includes:
    a first coil configured to receive a first voltage from a first power source, and
    a second coil configured to receive a second voltage from a second power source, and
the controlling the voltage applied to the at least one coil includes selectively applying the first voltage and the second voltage to the first coil and the second coil, respectively, based on the rotation speed of the drum and the vibration value of the tub.

15. The method of claim 14, wherein
the selectively applying the first voltage and the second voltage to the first coil and the second coil, respectively, includes:
    applying the first voltage to the first coil based on the vibration value of the tub falling within a first reference range,
    applying the second voltage to the second coil based on the vibration value of the tub falling within a second reference range; and
    applying the first voltage and the second voltage to the first coil and the second coil, respectively, based on the vibration value of the tub falling within a third reference range.

16. The method of claim 11, wherein
the at least one damper includes:
    at least one front damper with a first coil and disposed close to a front side of the tub, and
    at least one rear damper with a second coil and disposed close to a rear side of the tub, and
the controlling the voltage applied to the at least one coil includes:
    controlling the voltage applied to the first coil and the second coil so that a damping force of the at least one rear damper is greater than a damping force of the at least one front damper in a first section of a washing machine process in which the drum is accelerated from a first speed to a second speed; and
    controlling the voltage applied to the first coil and the second coil so that the damping force of the at least one front damper is greater than the damping force of the at least one rear damper in a second section of the washing machine process in which the drum is accelerated from the second speed to a third speed.

17. The method of claim 16, wherein
160 RPM is in between the first speed and the second speed, and 230 RPM is in between the second speed and the third speed.

18. The method of claim 11, wherein
the washing machine further includes:
    a vibration sensor configured to detect the vibration value of the tub, and
the at least one damper includes:
    at least one front damper with a first coil and disposed close to the front side of the tub, and
    at least one rear damper with a second coil and disposed close to the rear side of the tub, and
the controlling the voltage applied to the at least one coil includes:
    determining a first vibration value generated at the front side of the tub and a second vibration value generated at the rear side of the tub based on the vibration value of the tub detected by the vibration sensor,
    controlling the voltage applied to the first coil based on the first vibration value, and
    controlling the voltage applied to the second coil based on the second vibration value.

19. The method of claim 18, wherein
the controlling the voltage applied to the at least one coil includes:
    controlling the voltage applied to the first coil and the second coil so that a damping force of the front damper is greater than a damping force of the rear damper based on the first vibration value being greater than the second vibration value, and
    controlling the voltage applied to the first coil and the second coil so that the damping force of the rear damper is greater than the damping force of the front damper in case that the second vibration value is greater than the first vibration value.

20. The method of claim 19, wherein
the controlling the voltage applied to the first coil and the second coil so that the damping force of the front damper is greater than the damping force of the rear damper includes adjusting a duty ratio of the voltage applied to the first coil to be higher than a duty ratio of the voltage applied to the second coil, and
the controlling the voltage applied to the first coil and the second coil so that the damping force of the rear damper is greater than the damping force of the front damper includes adjusting the duty ratio of the voltage applied to the second coil to be higher than the duty ratio of the voltage applied to the first coil.

* * * * *